(12) United States Patent
Wu et al.

(10) Patent No.: US 10,192,274 B2
(45) Date of Patent: Jan. 29, 2019

(54) METHOD AND DEVICE FOR PROVIDING ONLINE GIFTING

(71) Applicant: Tencent Technology (Shenzhen) Company Limited, Shenzhen (CN)

(72) Inventors: Yi Wu, Shenzhen (CN); Chen Gong, Shenzhen (CN); Yongxin He, Shenzhen (CN); Yaya Liu, Shenzhen (CN); Chi Zhang, Shenzhen (CN); Shangyan Chen, Shenzhen (CN); Wei Zou, Shenzhen (CN); Jun Liang, Shenzhen (CN); Chaojun Chen, Shenzhen (CN); Jieping Chen, Shenzhen (CN); Dongdong Xie, Shenzhen (CN); Jiaxi Xu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 499 days.

(21) Appl. No.: 14/318,054

(22) Filed: Jun. 27, 2014

(65) Prior Publication Data
US 2015/0310567 A1    Oct. 29, 2015

Related U.S. Application Data

(63) Continuation of application No. PCT/CN2014/076408, filed on Apr. 28, 2014.

(51) Int. Cl.
*G06Q 30/00* (2012.01)
*G06Q 50/00* (2012.01)
(Continued)

(52) U.S. Cl.
CPC ............ *G06Q 50/01* (2013.01); *G06Q 20/10* (2013.01); *G06Q 20/405* (2013.01); *G06Q 30/0621* (2013.01)

(58) Field of Classification Search
CPC ..... G06Q 30/06; G06Q 30/0633; G06Q 50/01
(Continued)

(56) References Cited

U.S. PATENT DOCUMENTS 8,548,865 B1 * 10/2013 Ho .......................... G06Q 10/10
705/26.1
2009/0171804 A1    7/2009 Lee et al.
(Continued)

FOREIGN PATENT DOCUMENTS

CN          103186635 A       7/2013

OTHER PUBLICATIONS

MC., "A Frog or a Prince," Catalog Age, Mar. 15, 2001.*
(Continued)

*Primary Examiner* — Brandy A Zukanovich
(74) *Attorney, Agent, or Firm* — Morgan, Lewis & Bockius LLP

(57) ABSTRACT

A method and device for providing dynamically determined gift creation and dissemination in an online environment, including: receiving a gifting request from a first user for dynamically creating and disseminating one or more gifts to one or more recipients in the online environment, wherein the gifting request includes one or more gifting constraints that un-deterministically specify at least one of (1) a respective identity for at least one recipient and (2) a respective gift value for at least one gift; and dynamically creating and disseminating at least one gift in accordance with the one or more gifting constraints, including at least one of: dynamically selecting a respective gift value for at least one gifts in accordance with the one or more gifting constraints; and dynamically determining a respective identity for at least one recipient for at least one gift in accordance with the one or more gifting constraints.

18 Claims, 14 Drawing Sheets

(51) Int. Cl.
*G06Q 30/06* (2012.01)
*G06Q 20/10* (2012.01)
*G06Q 20/40* (2012.01)

(58) Field of Classification Search
USPC .............................................. 705/26.1, 27.1
See application file for complete search history.

(56) References Cited

U.S. PATENT DOCUMENTS

2009/0254453 A1   10/2009  Sanguinetti et al.
2010/0023341 A1    1/2010  Ledbetter et al.
2013/0268391 A1* 10/2013  Esch ...................... G06Q 30/02
                                                              705/26.7

OTHER PUBLICATIONS

Tencent Technology, ISR, PCT/CN2014/076408, dated Jan. 26, 2015, 3 pgs.
Tencent Technology, Written Opinion, PCT/CN2014/076408, dated Jan. 26, 2015, 5 pgs.
Tencent Technology, IPRP, PCT/CN2014/076408, dated Nov. 3, 2016, 6 pgs.

* cited by examiner

METHOD AND DEVICE FOR PROVIDING ONLINE GIFTING

RELATED APPLICATION

This application is a continuation application of PCT Patent Application No. PCT/CN2014/076408, entitled "METHOD AND DEVICE FOR PROVIDING ONLINE GIFTING" filed on Apr. 28, 2014, which is incorporated by reference in its entirety.

TECHNICAL FIELD

The present disclosure relates to the field of Internet technologies, and in particular, to a method and device for providing online gifting in a social network environment.

BACKGROUND

With the development of the Internet, many activities traditionally conducted in person can now be carried out online. Exchanging gifts on special occasions, such as holidays, anniversaries, or birthdays, can be done electronically via email, or other online social network platforms. For example, one user may pick out an electronic card or a virtual present (e.g., virtual flowers) from an online database provided by a host, specify the email address or username of the recipient, and have the selected electronic card or virtual present sent to the selected recipient via email or a notification on the social network platform. The problem with these online gifts is that they become less interesting to the recipients over time because there is no intrinsic real-world value in these virtual gifts and cards.

Sometimes, a gift of actual monetary value can be sent from one user to another user in the form of a financial transaction (e.g., an account transfer using an online payment platform). In such cases, the sender has to specify the exact amount of the transfer and the exact identity of the recipient in order to complete the transaction. The problem of these monetary gifts is that the sender has to spend a lot of time and trouble to provide the details of the financial transaction, and there is little fun and sentiment expressed in these plain monetary transfers. There are also no real interactions between the sender and recipient of the gift, making the sender less motivated to send such a gift.

Thus, these conventional online gifting methods are dull, cumbersome, and non-interactive, and are inadequate in address the needs to online gifting among people today.

SUMMARY

The present disclosure describes a method and device for providing online gifting in a social network environment. In particular, in some embodiments, the gifts are linked with actual monetary values, and the gifting can be executed in the form of a financial account transfer when the gift is successfully claimed or accepted by a recipient. Furthermore, unlike in a conventional financial transfer, the sender of the gift does not need to exactly specify the value of the gift, and/or the exact identity of the gift recipient. Instead, a gift server (e.g., a server of a social network platform) allows a user to specify one or more gifting constraints, such as a gift value range (e.g., $1-$10), a maximum gift count (e.g., 100), a characteristic of eligible recipients (e.g., my "co-workers" group, or my "family" group, people who follows my micro-blog, etc.), a gift dissemination trigger condition (e.g., when my blog followers reaches 1000, at midnight on New Year's Eve, etc.), in a single gifting request (e.g., generated by filling out a form in an online gift creation user interface provided by the gift server). By using a single gifting request containing at least one such constraint, the user can rely on the gift server to automatically generate any number of gifts, with varying amounts, and/or different recipients while observing the requirements set by the user's gifting constraints. Thus, the user can easily and quickly create a large number of gifts with monetary values, without having to laboriously set up a separate financial transaction for each recipient. In addition, in some embodiments, the gift dynamically created in accordance with the gifting request can be disseminated to more than one eligible recipient via an online social networking platform, and the server can facilitate many types of interactive and fun gift claiming and acceptance processes to improve the social and personal impact of the gifts.

In some embodiments, the method of providing dynamically determined gift creation and dissemination in an online environment is performed at a server having one or more processors and memory. The method includes: receiving a gifting request from a first user for dynamically creating and disseminating one or more gifts to one or more recipients in the online environment, where the gifting request includes one or more gifting constraints that un-deterministically specify at least one of (1) a respective identity for at least one recipient and (2) a respective gift value for at least one gift; and dynamically creating and disseminating at least one gift in accordance with the one or more gifting constraints, including at least one of: (1) dynamically selecting, without further input from the first user, a respective gift value for at least one of a plurality of dynamically created gifts in accordance with the one or more gifting constraints; and dynamically determining, without further input from the first user, a respective identity for at least one of a plurality of recipients for at least one dynamically created gift in accordance with the one or more gifting constraints.

In some embodiments, an electronic device (e.g., a server) includes one or more processors and memory storing one or more programs for execution by the one or more processors, the one or more programs including instructions for performing the operations of the methods described herein. In some embodiments, a non-transitory computer readable storage medium storing one or more programs, the one or more programs comprising instructions, which, when executed by an electronic device (e.g., a server) each with one or more processors, cause the electronic device to perform the operations of the methods described herein.

In some embodiments, an electronic device (e.g., a client device) includes one or more processors and memory storing one or more programs for execution by the one or more processors, the one or more programs including instructions for performing the operations of the methods described herein. In some embodiments, a non-transitory computer readable storage medium storing one or more programs, the one or more programs comprising instructions, which, when executed by an electronic device (e.g., a server) each with one or more processors, cause the electronic device to perform the operations of the methods described herein. In some embodiments, as would be apparent to a person of ordinary skills in the art, the operations performed by the client device is complementary to the operations performed by the server and may be controlled by instructions received from the server. In addition, the data and information needed by the server to perform the methods described herein are provided by the client device.

Various advantages of the present invention would be apparent in light of the descriptions below.

BRIEF DESCRIPTION OF THE DRAWINGS

Like reference numerals refer to corresponding parts throughout the several views of the drawings.

DESCRIPTION OF EMBODIMENTS

Gifting is a practice that has long existed before the creation of the Internet. For a long time after the development of the Internet, online gifting has been limited to simple virtual gifts such as electronic cards, virtual flowers, virtual accessories, links to online resources (e.g., videos, flash videos, store registries, etc.), etc. Online monetary gifting has been limited to the form of an electronic gift card, which is purchased by the sender from an online store, and sent to the recipient specified by the sender via email. Some financial institutions also allow the user to create a one-to-one account transfer with an added gift message. These conventional methods of online gifting can be quite cumbersome and uninteresting to the parties involved. Thus, the utilization of these online gifting methods has been rather limited, even if they have been an improvement in convenience as compared to gifting in person.

A method and device for providing online gifting in a social networking environment is described herein. In some embodiments, a user is enabled to easily create multiple online gifts using a single gifting request, where the details of each gifting transaction is handled by a gift server in accordance with one or more gifting constraints specified by the user in the gifting request. In some embodiments, the gift server provides and facilitates interactive and fun gift creation, sending, and claiming processes, which may further improve the efficiency and utility of online gifting activities.

A social networking platform connects people to others via common relationships and interests. Providing convenient, fun, and interactive gifting in an online environment, particularly through a social network platform, may help enhancing existing relationships and building new relationships for participating users. As described herein, in some embodiments, dynamically determined online gifting is provided via a social networking platform, such as a blog-platform, an online forum platform, a message board platform, a micro-blog platform, an instant message platform, an online chat-room platform, and a hybrid of one or more of the above platforms.

Figure 1:
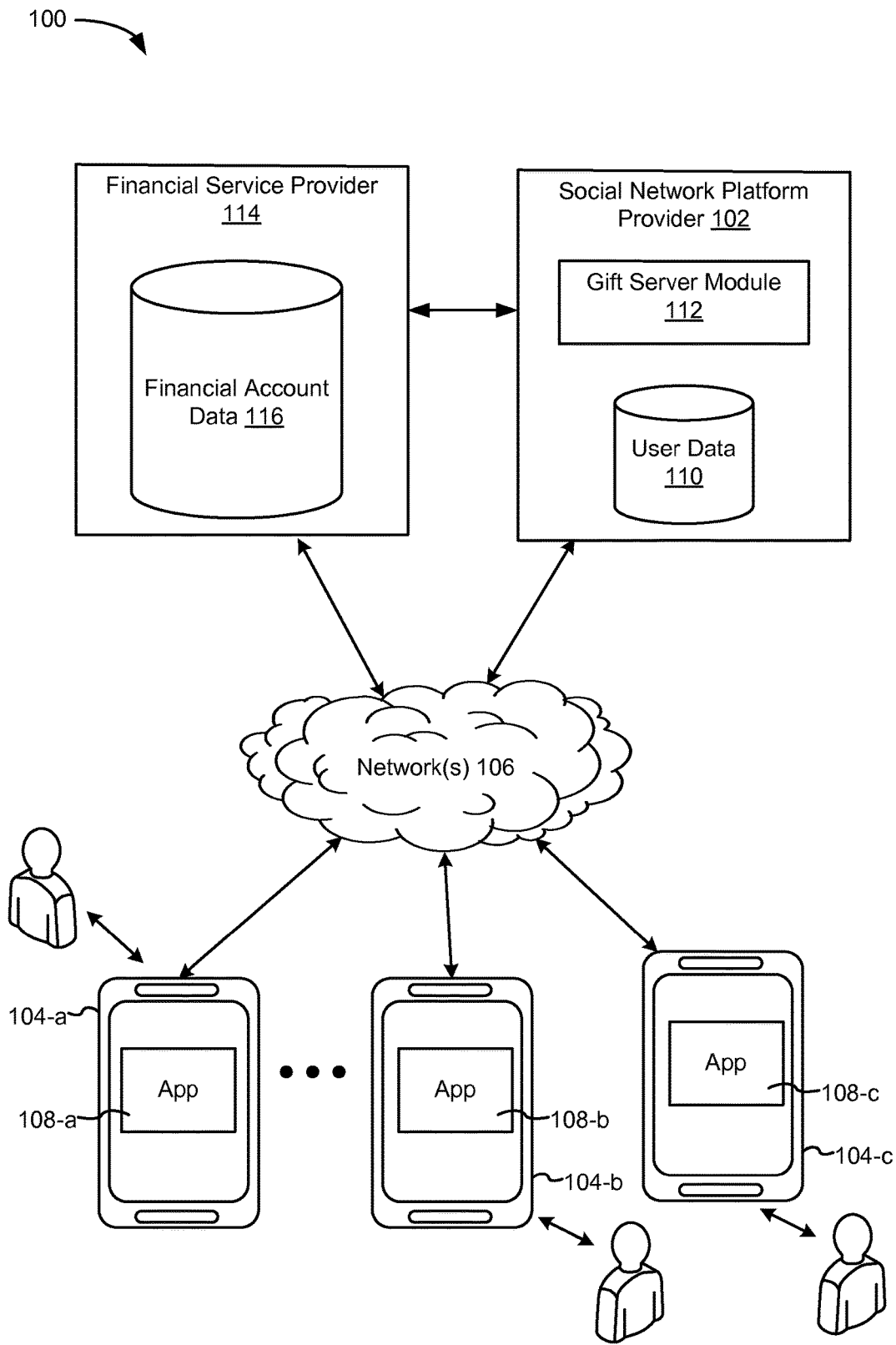
FIG. 1 is a block diagram of an exemplary operating environment for a method of providing dynamically determined gift creation and dissemination in accordance with some embodiments.

FIG. 1 is a block diagram illustrating an operating environment 100 for providing online gifting in accordance with some embodiments. As shown in FIG. 1, a social network platform server (e.g., server 102) provides social networking services (e.g., creation of messages, chat sessions, online posting, and other online social interactions) to a multitude of users operating their respective client devices (e.g., client devices 104a-c) via one or more networks 106. In some embodiments, each user interacts with another user by connecting to the server using a client application (e.g., social network application 108a-c) executing on the users' respective client devices. The server identifies the users in the social network by their respective online identities, such as usernames, and account identifiers. Typically, each user is associated with a group of one or more other users in the social network in one or more social network groups. For example, a user may create or join different social network groups based on his or her relationships and/or common interests with other members of each of the groups. In some embodiments, the server of the social network platform maintains a knowledge base (e.g., user database 110) of different characteristics (e.g., real name, contact information, interest, social economic status, online activity history, etc.) of the users, and their inter-connections and group memberships.

In some embodiments, the social network server provides one or more social networking services to its users. The user may invoke a particular service by interacting with a user interface provided on the client application (e.g., social network client application 108a-c) of the social network server. For example, a user may open a chat program, and initiate one or more one-on-one or group chat sessions with one or more social contacts (e.g., contacts in the user's contact list, or social network groups) by sending a text or voice message. In some embodiments, other forms of messages (e.g., images, videos, links, icons, animations, etc.) may also be sent from one user to one or more other users via the social network platform provided by the social network sever.

As described herein, the server of the social network further provides an online gifting service that a user may utilize to send monetary gifts to other users on the social network platform. In some embodiments, a gift server module 112 residing in the social network server performs part or all of the functions related to the gifting processes.

As shown in FIG. 1, in some embodiments, a financial service provider (e.g., an online payment service provider 114) allows the social network server 102 to establish a link between a user's social network account at the social network server 102 and the user's financial account at the financial server. In some embodiments, the financial service provider stores the account information for each user in a financial account database 116. Once the link has been established, the user is allowed to control and authorize financial account transfers (e.g., send and accept payments or monetary gifts) in its financial account, from a user interface of a social network client application (e.g., social network client application 108a-c). In particular, the user is allowed to communicate to others regarding the financial account transfers in the form of online gifts (e.g., red packets containing cash value), with the sender and recipient(s) specified using their social network account IDs. Other details and embodiments of the online gifting over the social network platform are described in other parts of the present disclosure.

As shown in FIG. 1, each user may interact with other users using a respective social network client application (e.g., social network client application 108a-c). In some embodiments, the social network client application provides user interface elements (e.g., text boxes, buttons, windows, message display areas, etc.) for the user to invoke a particular social network service, such as posting content to an online message board, sending a text or voice message to a specific user or group of users, initiating a voice or video chat session with another user, opening a group chat session, etc.

As described below, in some embodiments, a social network client application also provides various interfaces and user interface elements for invoking online gift creation and dissemination services provided by the social network server. When the social network server sends a gift notification to a particular user via the social network platform, e.g., in the form of an instant message, a link, an interactive widget, etc., the user receiving the notification can view the notification in the social network client application, and interact with the notification in the social network client application to claim the gift or participate in a gift claiming process monitored by the social network server 102. In some embodiments, the social network client application is configured to activate and control one or more sensors (e.g., touch sensors, proximity sensors, temperature sensors, gyros, accelerometers, ambient light sensors, motion sensors, etc.) and peripheral devices (e.g., speakers, microphone, camera, video camera, display, network adaptors, etc.) to capture and send information to the social network server, and to provide information received from the server to the user.

The exemplary operating environment 100 of FIG. 1 is merely illustrative. Other configurations of the social network server and the financial service provider are possible in various embodiments. For example, in some embodiments, the social network server may not directly communicate with the financial service provider, but rely on the users to obtain authorization for execute the account transfers directly from the financial service provider. For example, in some embodiments, the social network server optionally helps the user to create the online gifts, and allows the user to directly contact the financial service provider with the created online gifts to obtain authorization for disseminating the gifts. The user may then provide the obtained authorization to the social network server, which in turn sends the authorization and the online gifts to the recipients via the social network platform. The recipients then contact the financial service provider with the received authorization and the received gifts to complete the account transfers. Other variations of the operating environment are possible.

As shown in FIG. 1, examples of the client devices 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 106 include local area networks ("LAN") and wide area networks ("WAN") such as the Internet. One or more networks 106 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi Fi, voice over Internet Protocol (VoIP), WiMAX, or any other suitable communication protocol.

Server system 102 is implemented on one or more standalone data processing apparatuses or a distributed network of computers. In some embodiments, server system 102 also employs various virtual devices and/or services of third party service providers (e.g., third-party cloud service providers) to provide the underlying computing resources and/or infrastructure resources of server system 102.

FIGS. 2A-2D are exemplary user interfaces illustrating user interactions for creating, sending, and claiming gifts in a online environment in accordance with some embodiments.

Figure 2A:
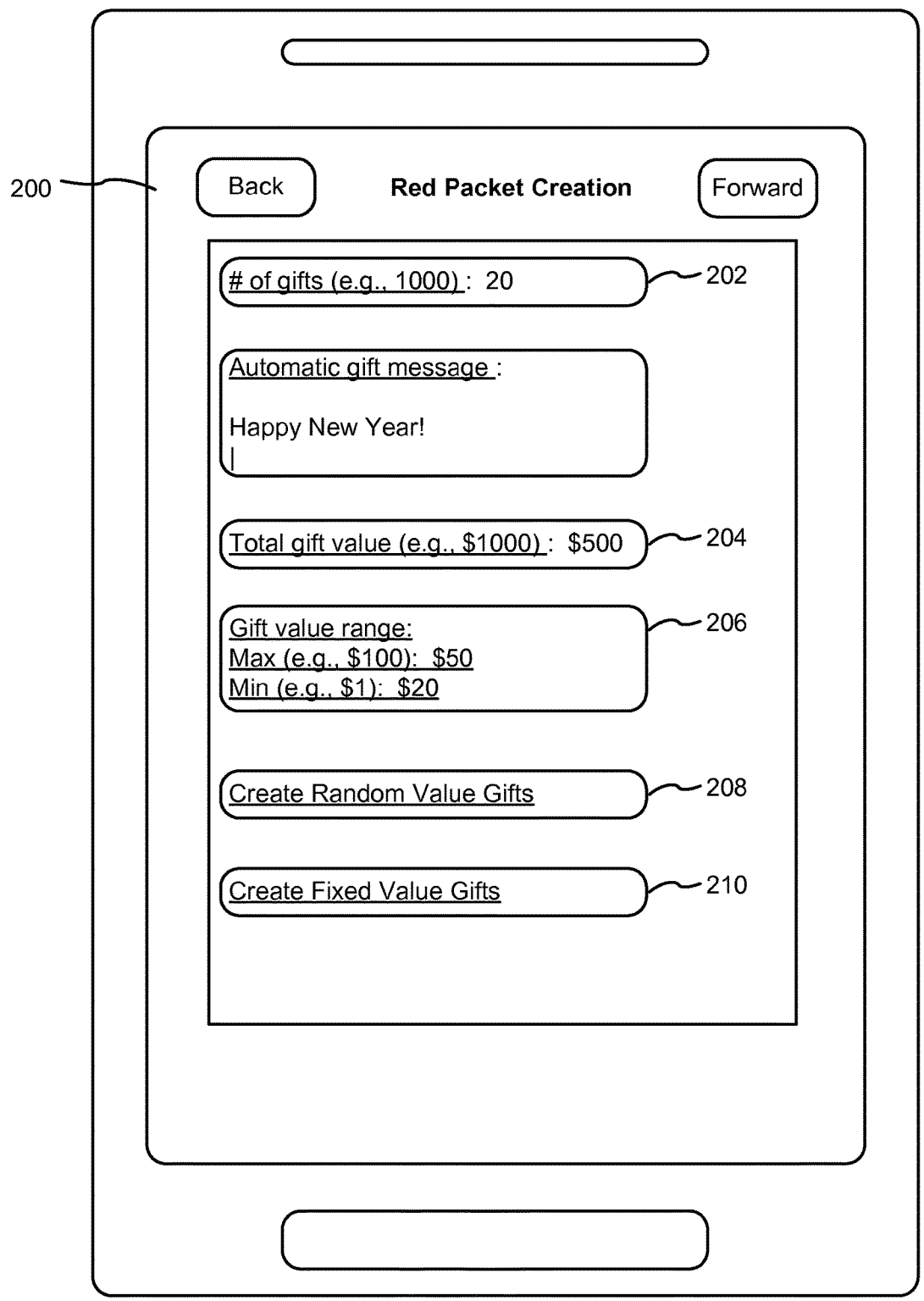
FIGS. 2A-2D are exemplary user interfaces illustrating user interactions for creating, sending, and claiming gifts in a online environment in accordance with some embodiments.

As shown in FIG. 2A, a user can initiate a gifting request to create one or more monetary gifts using a user interface provided on the social network client application (e.g., social network client application 108a-c in FIG. 1) executing on a user's device (e.g., a mobile phone, a tablet device, a laptop computer, etc.). The user interface 200 shown in FIG. 2A is optionally invoked by the user selecting a gift creation button in the normal operating interface of the social network client application. In the user interface 200, the user is provided with options to set one or more gifting constraints.

For example, the user is optionally allowed to set a total or maximum gift count (e.g., a total number of "red packets" in input field 202) as one constraint to create multiple gifts using a single gifting request. This differs from conventional gift creation interfaces, where only a single gift is created by each request.

As shown in FIG. 2A, the user may also set a total gift value constraint (e.g., a total value of $1000) in a total gift value field 204. Based on this total gift value constraint, the sum of the values of all gifts created using this gifting request is equal to or less than the specified total gift value. In some embodiments, the user may also enter a gift value range (e.g., a maximum and a minimum gift value for a single gift) for the gifts created using the gifting request in a gift value range field 206.

In some embodiments, the user may also specify using (e.g., using input field 208) whether the value of each gift is to be randomly determined by the gift server (e.g., the social network server 102) in accordance with all of the gifting constraints provided by the user in the gifting request. In some embodiments, the user may choose to create fixed value gifts (e.g., using input field 210) in accordance with the gifting constraints provided by the user in the gifting request.

In some embodiments, once the user interface 200 may not include all of the options shown in FIG. 2A. In addition, in some embodiments, the user is not required to provide a selection or value for each input field shown in FIG. 2A. If the user leaves a particular gifting constraint empty, the server fills in the value with a default value, or leaves it unconstrained.

Figure 2B:
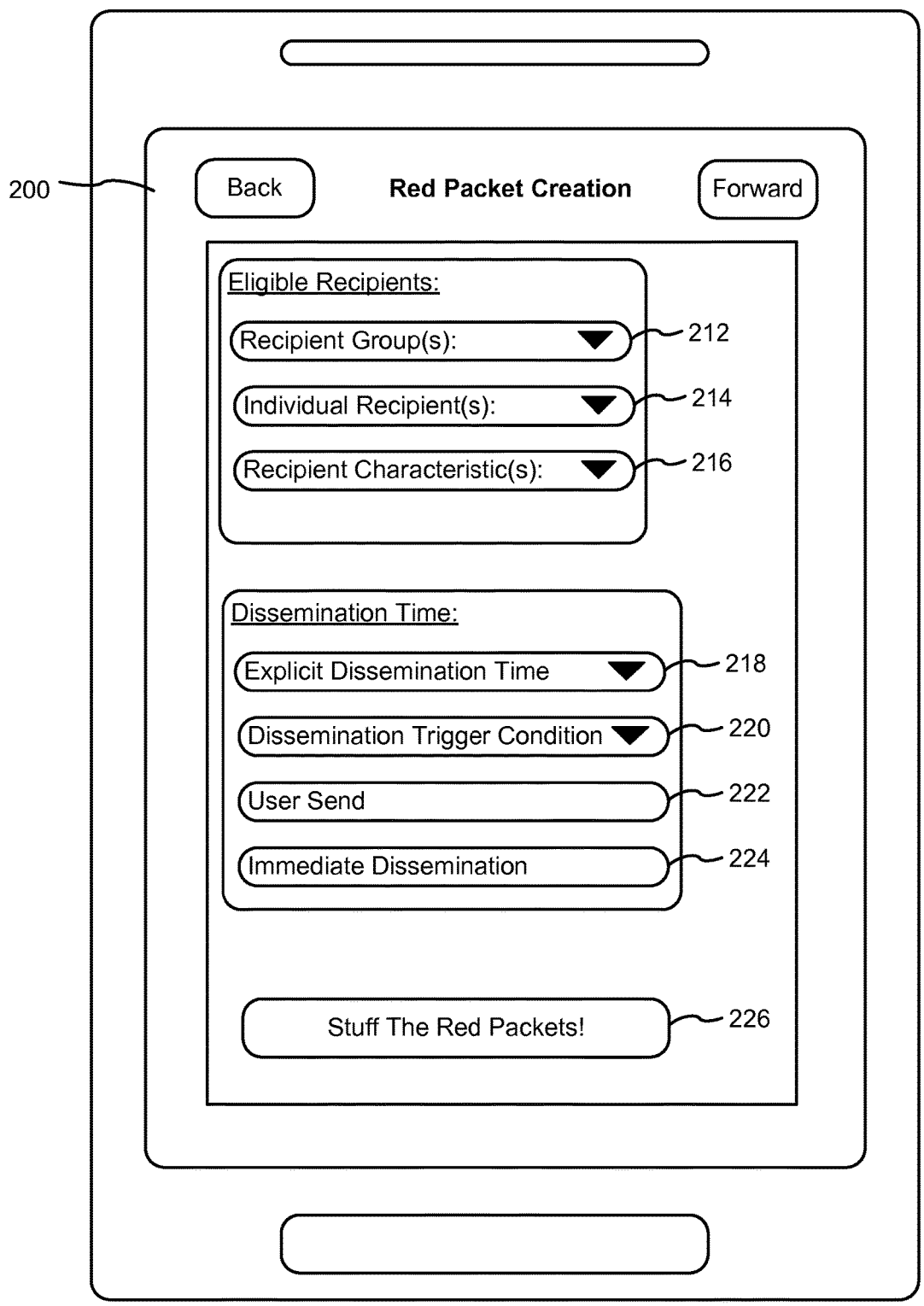

In some embodiments, the user interface 200 provides options for the user to select one or more eligible recipients for the gifts created in response to the gifting request. For example, as shown in FIG. 2B, the user interface 200 optionally provides a listing of social network groups with which the user is associated (e.g., via a drop-down menu 212), and allows the user to select one or more social network groups as the pool of the eligible recipients for the gifts created in response to the gifting request. In some embodiments, the gift server randomly selects the necessary number of eligible recipients from the pool of users specified by the user. In some embodiments, the gift server sends a gift notification to all users in the pool, and disseminates the gifts to a subset of the users in the pool who have performed a successful gift claim process (e.g., by fastest claim times, within a predetermined claim period, and/or performing a required gift claiming action, etc.)

In some embodiments, the user interface 200 provides options for the user to explicitly select the eligible recipients for the gifts in the gifting request (e.g., via the drop down menu 214). In some embodiments, the exact identity of the actual recipients of the gifts are not determined by the user, but by the gifting server according to one or more rules specified by the user, or randomly by the gifting server, or according to actions performed (e.g., predetermined activities for claiming the gifts) by the actual recipients after a gift notification is sent to the eligible recipients.

In some embodiments, the user interface 200 allows the user to specify (e.g., via the drop down menu 216) one or more characteristics according to which the gifting server can select the eligible recipients. For example, in some embodiments, the user may specify all of his/her followers that have posted more than 10 messages to his/her account as the eligible recipients of the gifts. In another example, the user may optionally specify new contacts gained within the past year as the eligible recipients of the gifts. In some embodiments, the user interface 200 optionally allows the user to specify one or more actions that another user must perform in order to become eligible recipients for the gifts.

In some embodiments, the user interface 200 allows the user to specify when the gift notifications should be sent out to the eligible recipients via a gift dissemination time constraint input field 218 (e.g., the user may select "midnight on New Year's Eve", a user's birthday, a company anniversary, a public holiday, etc. as the dissemination time). In some embodiments, the user interface 200 allows the user to specify a gift dissemination trigger condition via a gift dissemination trigger input field 220, which when triggered by an eligible recipient, causes a gift notification to the eligible recipient. For example, a user may set a keyword (e.g., "Happy New Year" or "Best Wishes") as a gift dissemination trigger condition; and whenever the user receives a message from another user containing the keyword, a gift notification will be automatically sent to the other user. The other user can claim the gift by following the instructions contained in the gift notification. Other triggers for sending an already created gift are possible.

In some embodiments, the user interface 200 does not provide an option for the user to specifically identify the eligible recipients of the gifts. Instead, in some embodiments, after the gifts have been created successfully, the user may choose to send the gifts through a personal chat message to each of the recipients, e.g., via the "user-send" option 222.

In some embodiments, a default option is to disseminate the gift notifications as soon as the gifts are created in response to the gifting request. In some embodiments, the user may choose immediate dissemination via an immediate dissemination option 224 shown in the user interface 200.

In some embodiments, not all of the options discussed above are included in the user interface 200. Other options for identifying eligible recipients and determining dissemination time are possible.

In some embodiments, the exact gift value for a particular gift created in response to the gifting request is not known or determined until the gift is successfully claimed by an eligible recipient. In some embodiments, the exact identity of an actual recipient of a gift is not known or determined until the actual recipient has successfully claimed the gift. In some embodiments, gifts are created according to the gifting constraints in the gifting request, and gift notifications are sent to eligible recipients or posted online to the public. The exact gift value and the exact identity of recipients of the gift are not determined until a successful claim process has been completed by an eligible recipient.

In some embodiments, the user chooses to submit the gifting request after filling out the desired gifting constraints, e.g., by selecting a dedicated control (e.g., the "stuff the red packets" button 226). The client application receiving the user input composes the gifting request according to the gifting constraints entered by the user in user interface 200, and sends the gifting request to the server. When the server receives the gifting request, it verifies the available funding with the financial service provider, and creates the gifts according to the gifting constraints in the gifting request.

Figure 2C:
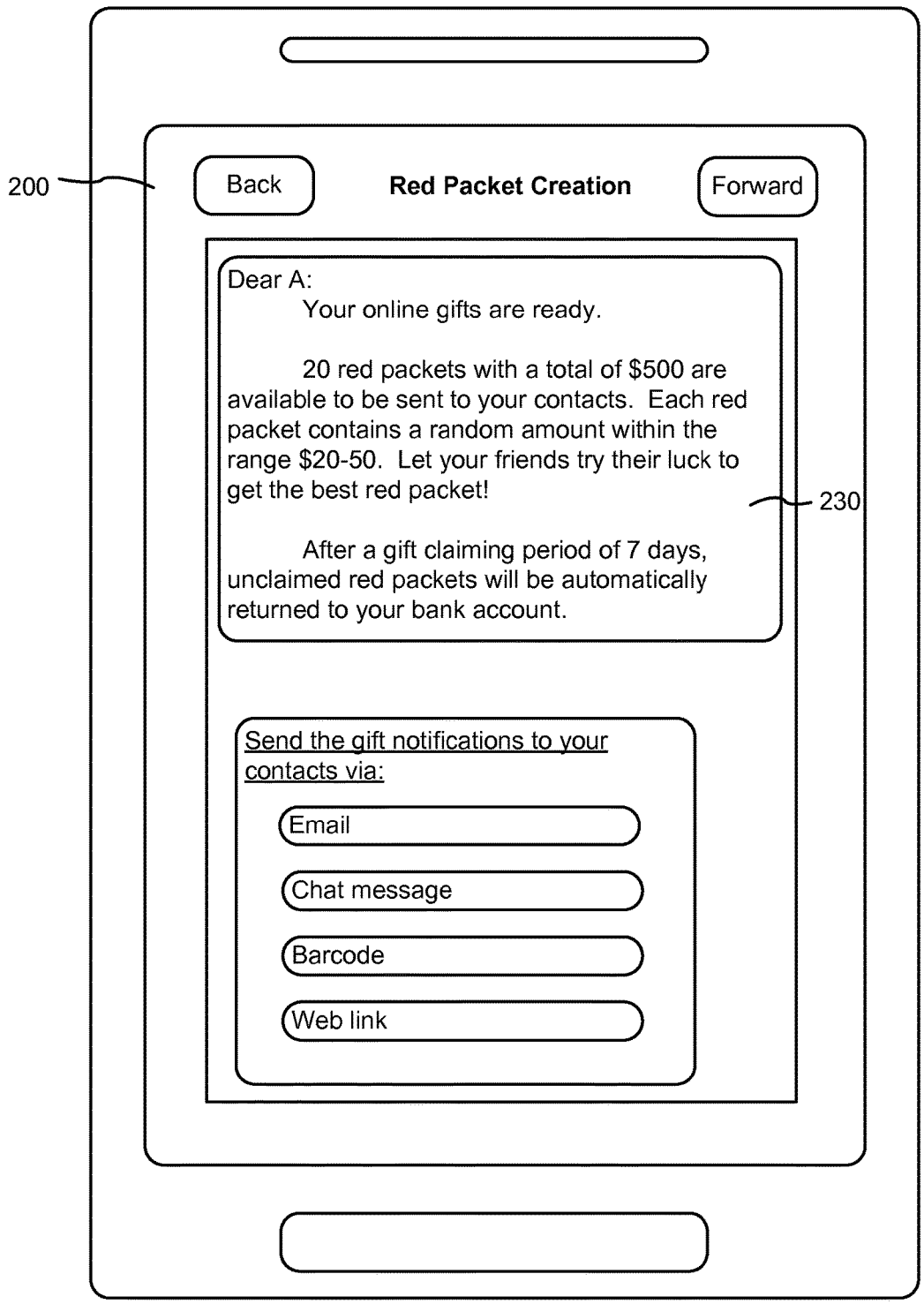

In some embodiments, as shown in FIG. 2C, once a user has created one or more gifts using the user interface 200, a gift creation notification 230 is provided to the user to indicate that either the gifts are available for the user to send directly to any recipients he or she wishes. In some embodiments, the gift creation notification indicates that respective gift notifications have been sent to the pool of eligible recipients. In some embodiments, the notification optionally includes a link to a gift claiming page, and the user can send the link to his or her contacts via the social network platform or other online communication tools (e.g., email). In some embodiments, the notification includes a barcode (e.g., a 2D barcode) that can be scanned by a user to visit the gift claiming page. In some embodiments, the gift notification is in the form of a chat message from the gift server to the user.

Figure 2D:
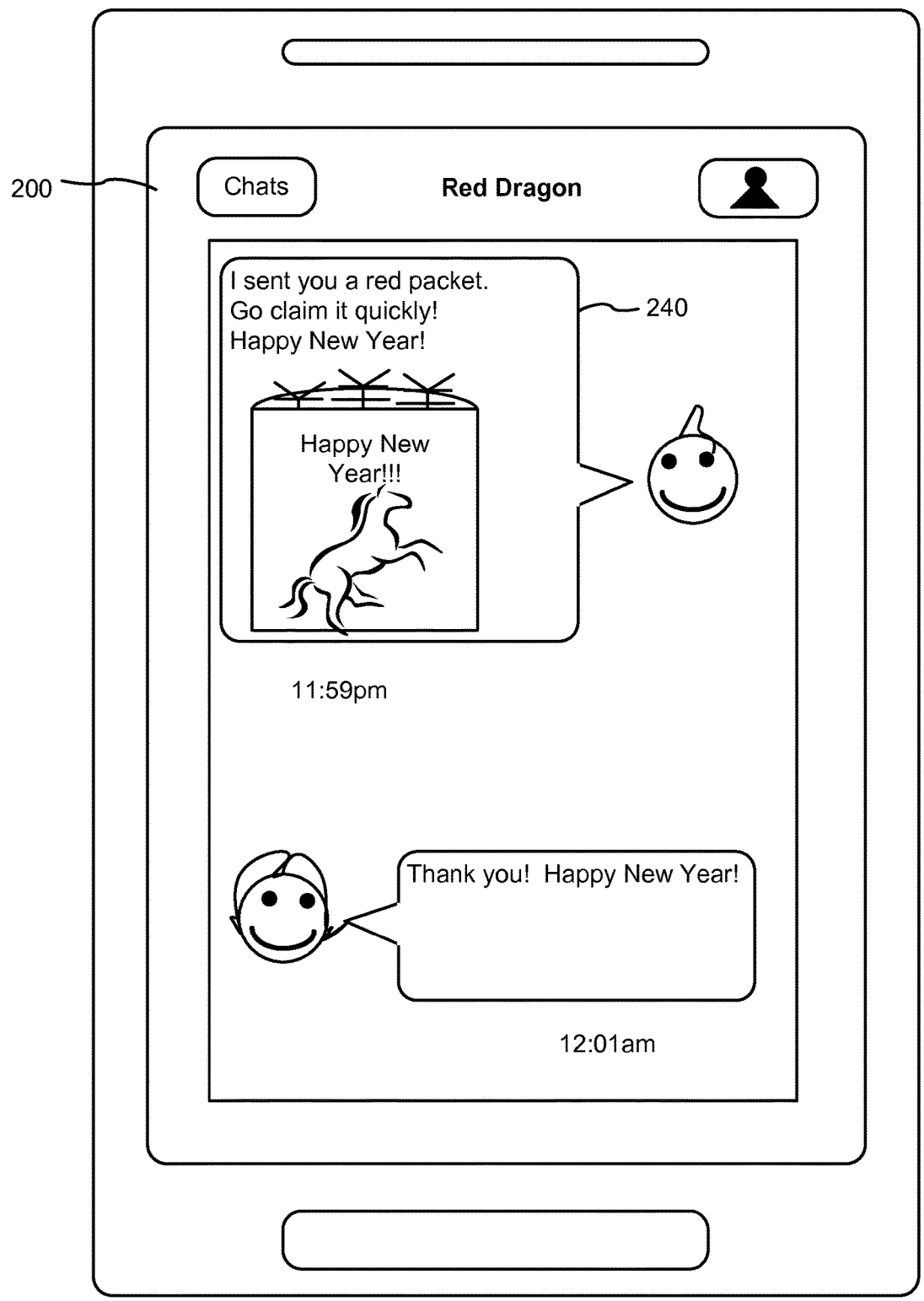
Figure 3A:
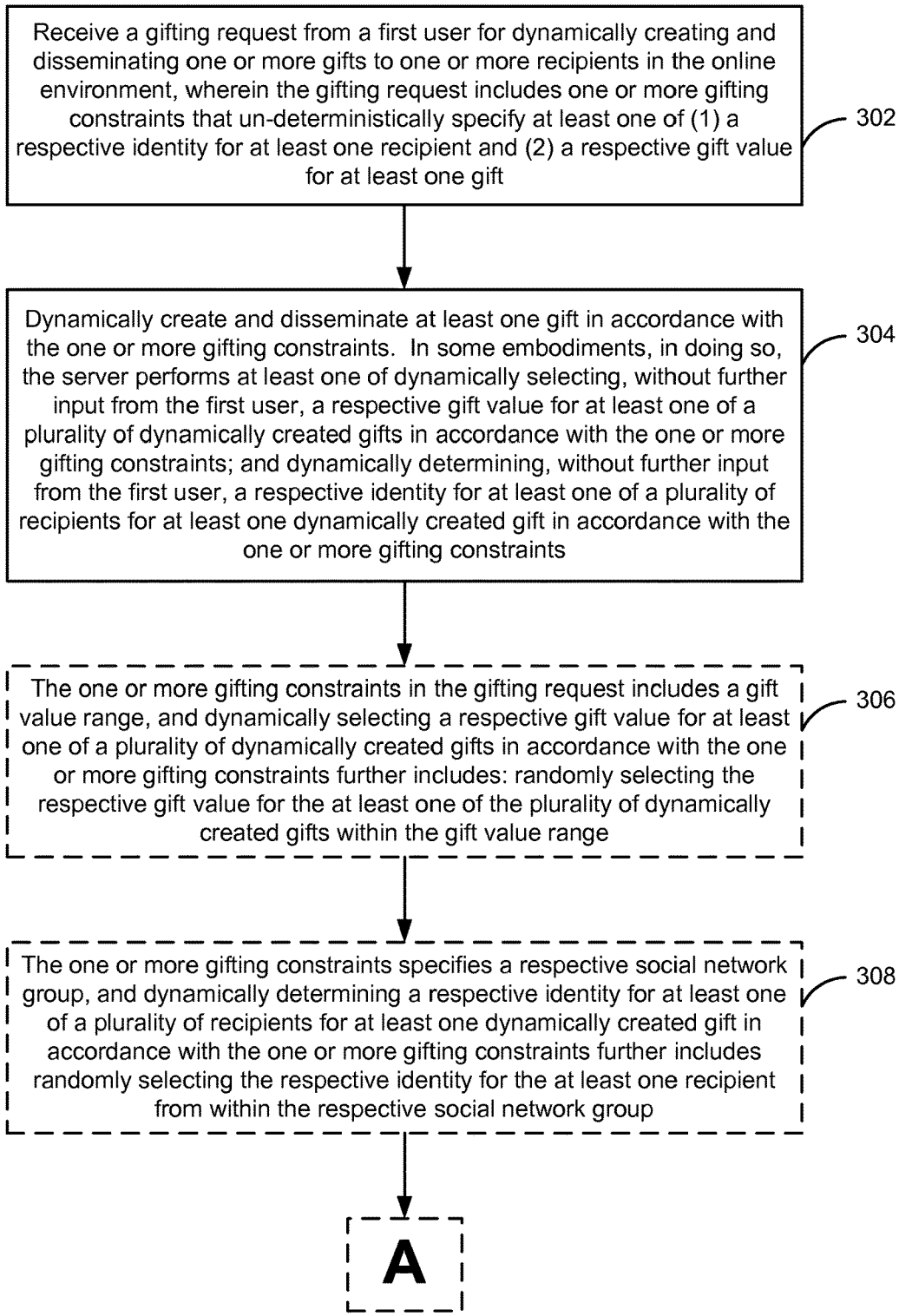
FIGS. 3A-3F are flowchart diagrams of a method of providing dynamically determined gift creation and dissemination in an online environment in accordance with some embodiments.
Figure 3B:
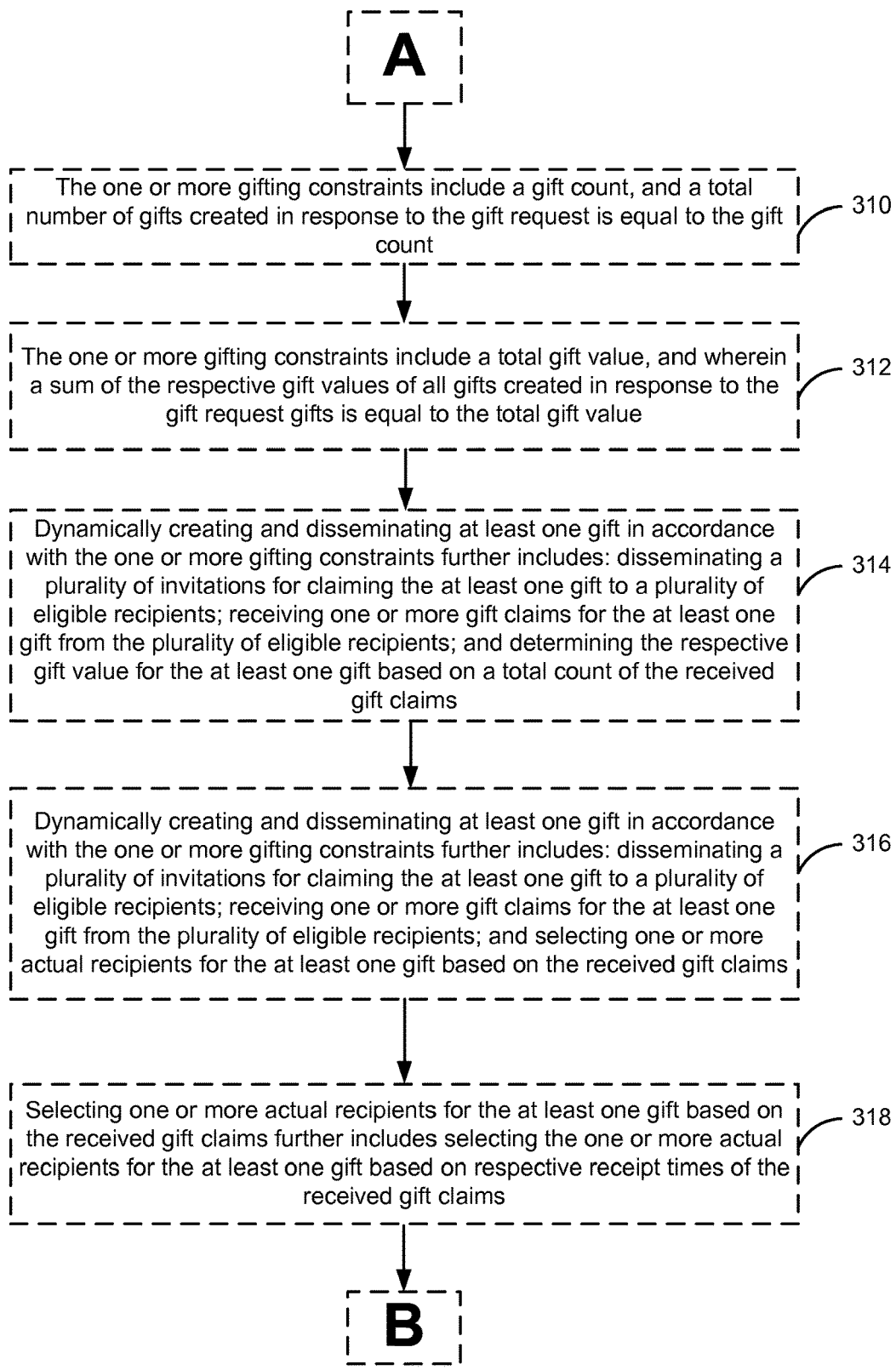
Figure 3C:
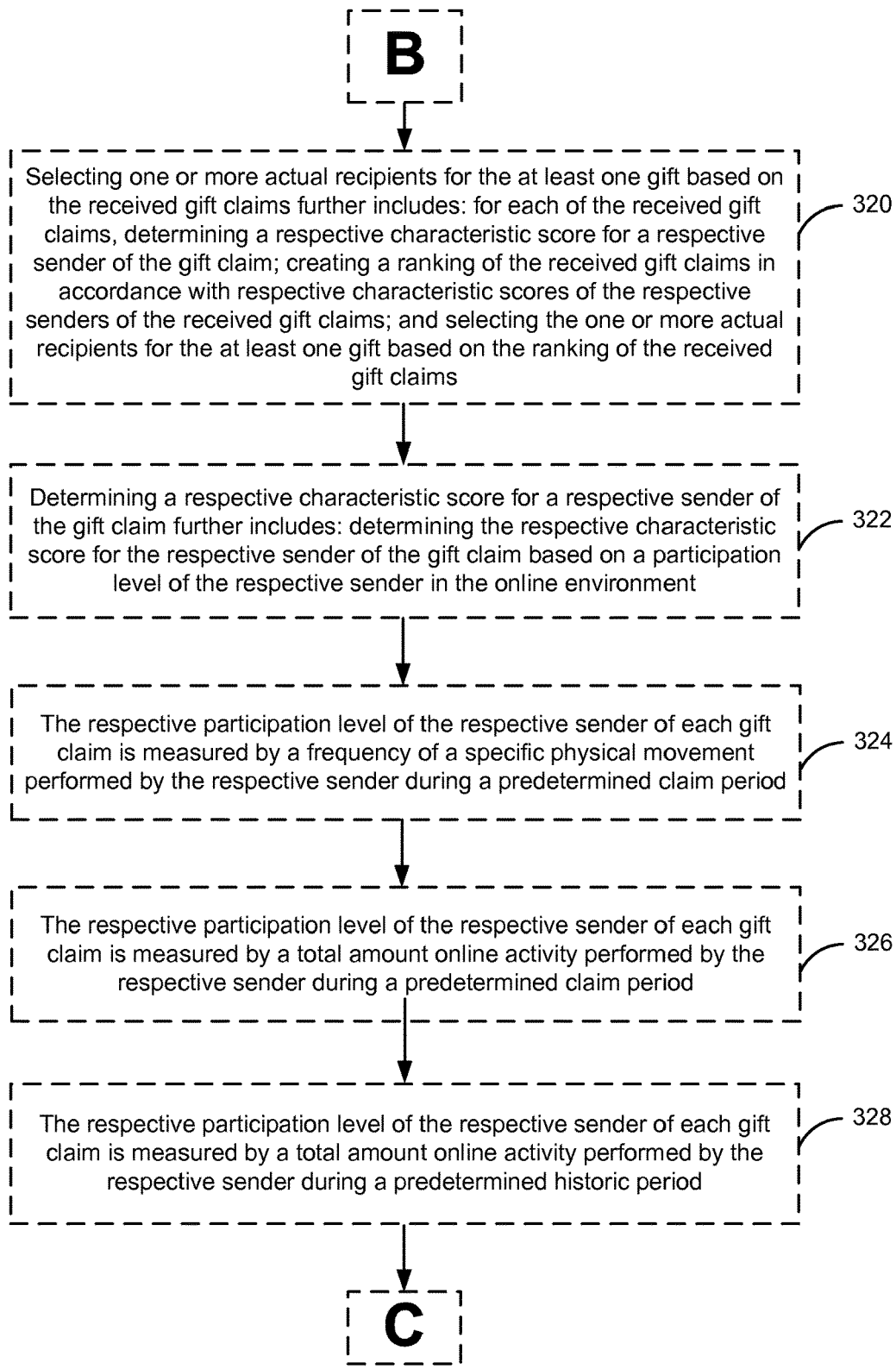
Figure 3D:
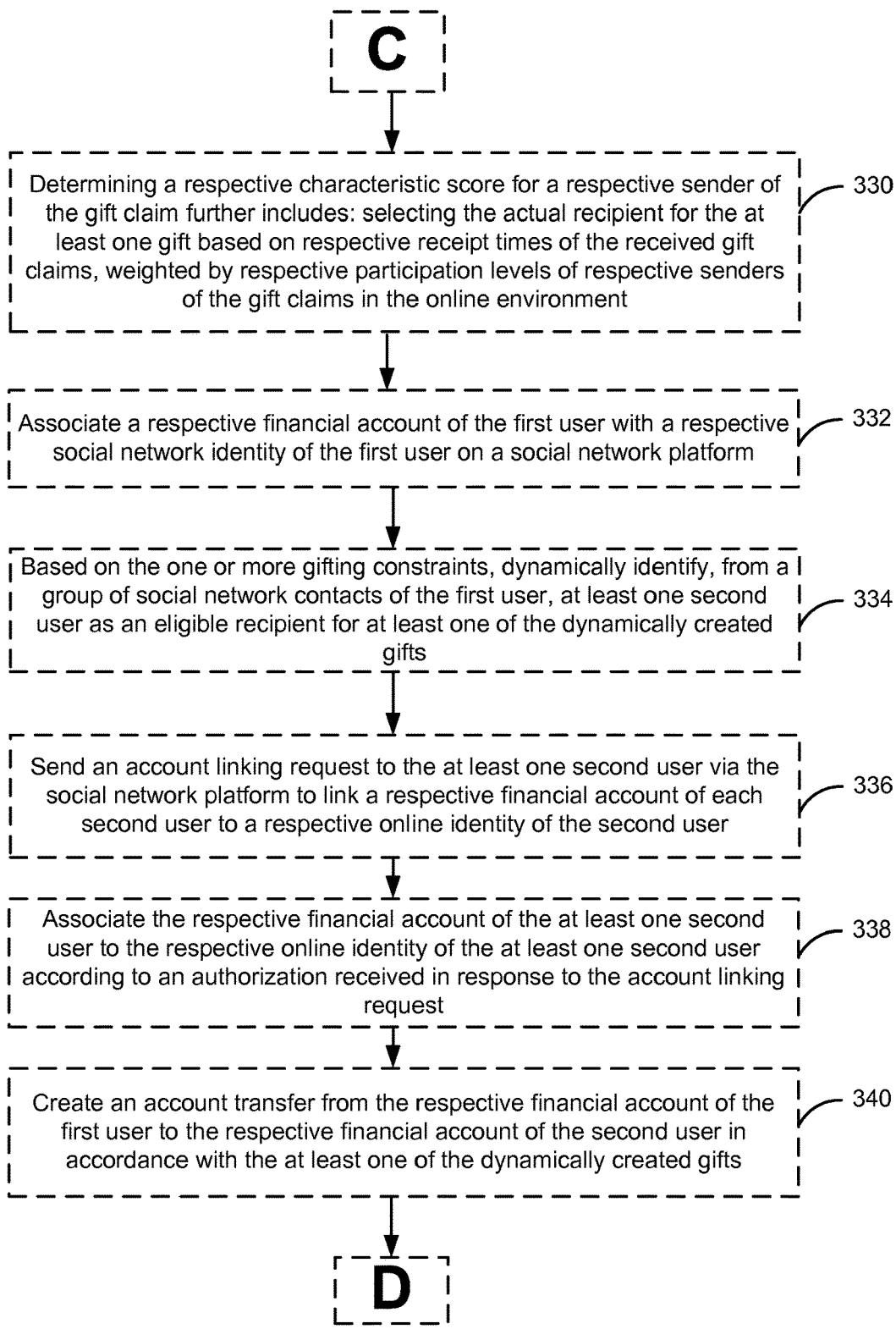
Figure 3E:
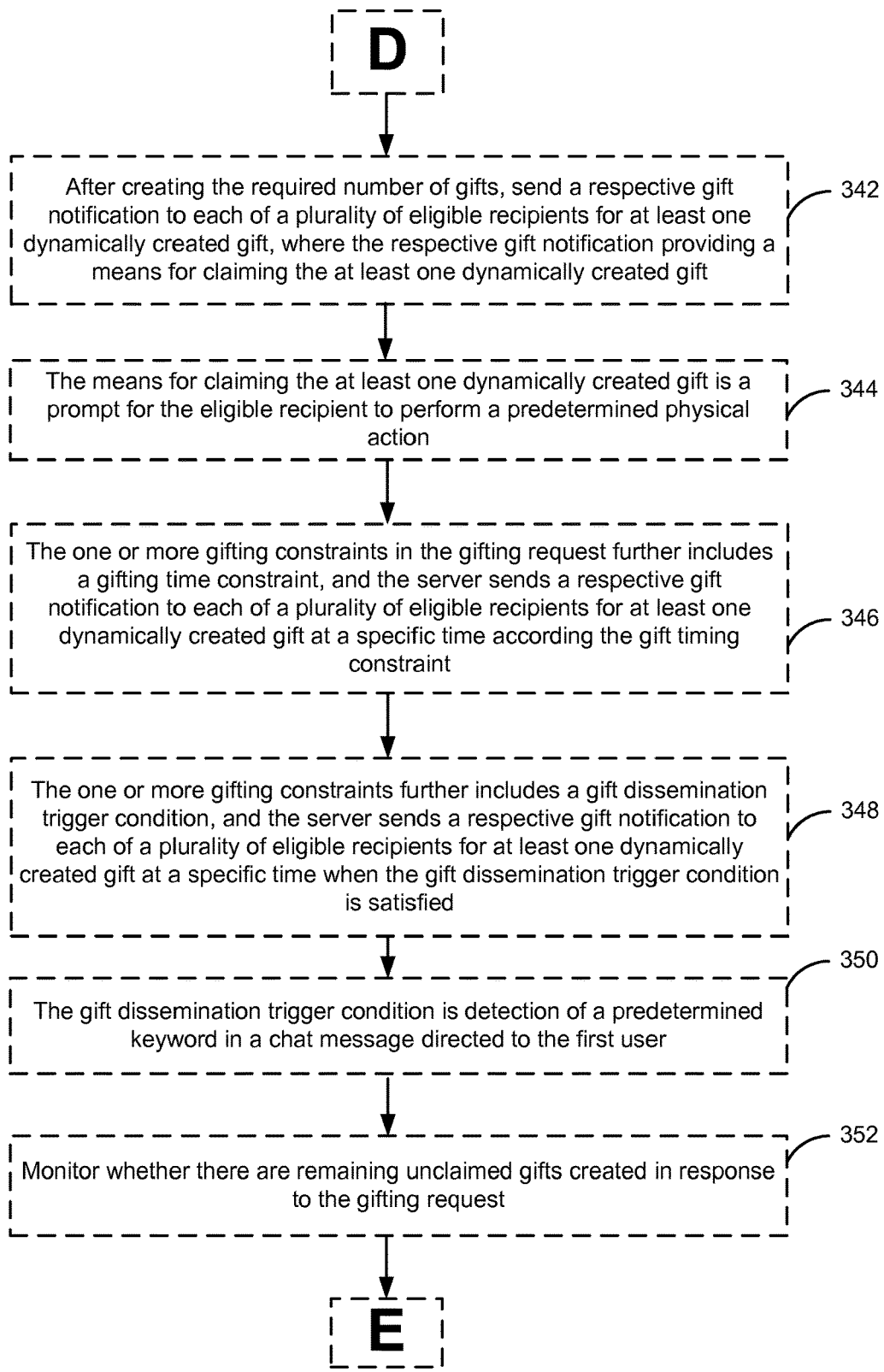
Figure 3F:
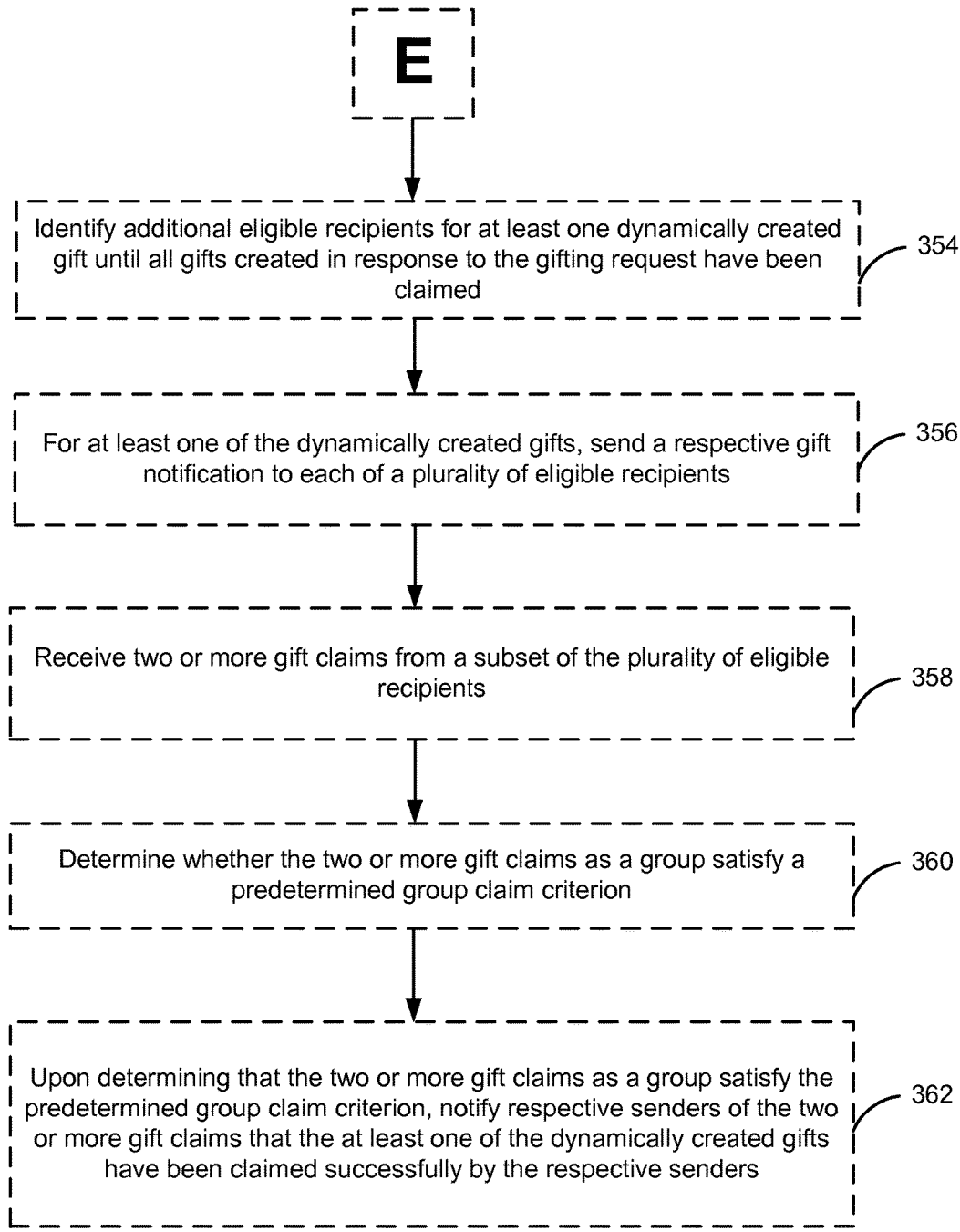

As shown in FIG. 2D, a user has received a gift notification 240 in the form of a chat message from another user. In some embodiments, this chat message is manually sent by the user that submitted the gifting request. In some embodiments, this chat message is automatically sent on behalf of the user that submitted the gifting request. In some embodiments, the chat message includes an interactive icon or button 242, which triggers a gift claiming action when selected by the user. In some embodiments, the chat message includes a personal or machine-generated message and/or including instruction for claiming the gift. For example, in some embodiments, selection of the interactive icon or button causes a gift claiming signal to be sent to the gift server. If the gift claiming action performed by the user meets predetermined gift claiming requirements, the gift server sends a notification to the user to indicate that the user has successfully claimed the gift, and optionally provides the details (e.g., exact amount) of the gift to the successful claimant. In some embodiments, once a gift has been successfully claimed by an eligible recipient, all information needed to execute the financial transfer for effecting this particular gifting transaction is obtained by the gift server, and the financial transaction can be executed immediately or at the election of the recipient at any future time.

In some embodiments, the gifting process is made more interactive by providing a real-time gifting session, where a group of users may gather together, and claim the dynamically created gifts in real-time near the sender of the gifts. In some embodiments, real-time visual feedback for the gift dissemination and claiming process are provided to a plurality of client devices participating in the gifting session, and a total number of gifts claimed and a total number of remaining gifts may be dynamically updated for each user on the user's individual device. For example, in some embodiments, when a sender of the gifts has started the real-time gifting session on his device, each eligible recipient can shake his own devices to claim the "shower" of gifts. In some embodiments, the faster a user shakes his device will help the user to obtain more of the gifts than another user shaking her device with a lower frequency. Other interactive gifting sessions are possible. Some examples of the interactive gifting sessions in other parts of the present disclosure.

FIGS. 3A-3F are flowchart diagrams of a method of providing dynamically determined gift creation and dissemination in an online environment in accordance with some embodiments.

In at least some embodiments, the method is performed by an electronic device (e.g., server device 102) with one or more processors and memory, or one or more components of the electronic device (e.g., server module 112). In some embodiments, the method is governed by instructions that are stored in a non-transitory computer readable storage medium and that are executed by one or more processors of an electronic device (e.g., processor(s) of server device).

In some embodiments, the server device receives (302) a gifting request from a first user for dynamically creating and disseminating one or more gifts to one or more recipients in the online environment, wherein the gifting request includes one or more gifting constraints that un-deterministically specify at least one of (1) a respective identity for at least one recipient and (2) a respective gift value for at least one gift. For example, in some embodiments, as shown in FIG. 2A, the user fill out one or more gifting constraints (e.g., total gift value constraint, total gift count constraints, gift value range, gift dissemination time, gift dissemination trigger condition, recipient eligibility requirements, gift claiming requirements, etc.) in a user interface provided by the server on the user's client device. In some embodiments, the user may specify an exact gift value or the exact identity of a gift recipient, but the user interface provides the option to un-deterministically (e.g., using ranges, and/or conditions) at least one of (1) a respective identity for at least one recipient and (2) a respective gift value for at least one gift that is later created in response to the gifting request.

In some embodiments, in response to the gifting request, the server dynamically creates and disseminates (304) at least one gift in accordance with the one or more gifting constraints. In some embodiments, in doing so, the server performs at least one of dynamically selecting, without further input from the first user, a respective gift value for at least one of a plurality of dynamically created gifts in accordance with the one or more gifting constraints; and dynamically determining, without further input from the first user, a respective identity for at least one of a plurality of recipients for at least one dynamically created gift in accordance with the one or more gifting constraints.

For example, in some embodiments, the one or more gifting constraints in the gifting request includes (306) a gift value range, and dynamically selecting a respective gift value for at least one of a plurality of dynamically created gifts in accordance with the one or more gifting constraints further includes: randomly selecting the respective gift value for the at least one of the plurality of dynamically created gifts within the gift value range. For example, if the user chooses to create two gifts with a gift value range of 2-10 dollars, the server may dynamically select the value for each of the two gifts using a pseudo-random algorithm that produces a number between 2 and 10 and use it as the value for the gift. This value selection is optionally performed before the gift is claimed by an eligible recipient or after the gift is claimed by an eligible recipient in different embodiments.

In some embodiments, the one or more gifting constraints specifies (308) a respective social network group, and dynamically determining a respective identity for at least one of a plurality of recipients for at least one dynamically created gift in accordance with the one or more gifting constraints further includes randomly selecting the respective identity for the at least one recipient from within the respective social network group. For example, instead of specifying the exact identity of the recipient in the gifting request, the user optionally specify a pool of eligible recipients by specifying a social networking group that he or she is associated with. For example, for one gift request, the user may specify the group named "family" as the pool of eligible recipients; and for another gift request, the user may specify the group named "co-workers" as the pool of eligible recipients. In another example, the user may also specify users that have subscribed to his or her micro-blog or message board as the pool of eligible recipient. The exact identities of the actual recipients of the gifts are not deterministically specified by the user in the gifting request. Instead, the server may randomly choose the eligible recipients from a pool specified by the user, in some embodiments.

In some embodiments, the one or more gifting constraints include (310) a gift count, and a total number of gifts created in response to the gift request is equal to the gift count. For example, the user may specify in the gifting request that 1000 gifts is to be created with a total gift amount of 1000 dollars. Based on such a constraint, the server may create 1000 gifts while observing all the other constraints specified in the gifting request. In some embodiments, the 1000 gifts may be identical gifts (e.g., in terms of value); and in some embodiments, at least some of the 1000 gifts may be different from one another (e.g., in terms of value and recipient). Because the user may use a single gift request to create many different gifts at the same time in accordance with the method described herein, the efficiency, ease of use, and utility of online gifting may be greatly improved.

In some embodiments, the one or more gifting constraints include (312) a total gift value, and wherein a sum of the respective gift values of all gifts created in response to the gift request gifts is equal to the total gift value. For example, the user may specify in the gifting request that 2 gifts are to be created using a total value of 10 dollars. Based on such a constraint, the server may create the 2 gifts with the same value (e.g., $5 each) or different values ($2 and $8), as long as the total value of all of the gifts created add up to the specified total gift value. In some embodiments, the exact value of the gifts may be indeterminate until both gifts have been claimed or when the claiming period has expired. In some embodiments, the exactly value of the gifts are chosen based on the claiming activity (e.g., claim time, or participation level) performed by eligible recipients.

In some embodiments, dynamically creating and disseminating at least one gift in accordance with the one or more gifting constraints further includes (314): disseminating a plurality of invitations for claiming the at least one gift to a plurality of eligible recipients; receiving one or more gift claims for the at least one gift from the plurality of eligible recipients; and determining the respective gift value for the at least one gift based on a total count of the received gift claims. For example, suppose that the gifting request specifies a total gift count of 10. In some embodiments, the server creates the 10 gifts and sends respective gift notifications to a plurality of eligible recipients (e.g., 10 or more eligible recipients) inviting them to claim the gifts. If only 8 people successfully claimed the gifts, the server optionally determines the value for each gift based on a total gift value and the total count of received gift claims. For example, if the total gift value is 10 dollars, and all 10 gifts are claimed, then the 10 dollars need to be divided among the 10 gifts. However, if only 8 people claimed the gift, the 10 dollars are divided among the 8 gifts. In some embodiments, the gift values are determined before the gifts are claimed, and the values of unclaimed gifts are refunded to the sender of the gifts.

In some embodiments, dynamically creating and disseminating at least one gift in accordance with the one or more gifting constraints further includes (316): disseminating a plurality of invitations for claiming the at least one gift to a plurality of eligible recipients; receiving one or more gift claims for the at least one gift from the plurality of eligible recipients; and selecting one or more actual recipients for the at least one gift based on the received gift claims. In some embodiments, the gifts are not automatically given to anyone who sends in a gift claim. For example, if the gift notification is a public broadcast (e.g., a published 2D barcode), many people may try to claim the gifts (e.g., by scanning the 2D barcode in his or her social network client application). In such cases, in some embodiments, the server selects the actual recipients of the gifts based on an evaluation of the received gift claims.

In some embodiments, selecting one or more actual recipients for the at least one gift based on the received gift claims further includes (318) selecting the one or more actual recipients for the at least one gift based on respective receipt times of the received gift claims. For example, if multiple people have submitted a gift claim for a particular gift, the server chooses the user that has submitted the first gift claim among all of the received gift claims for the particular gift. In some embodiments, the user does not know whether the gift is still available until he has submitted a gift claim and been notified of whether the claim was too late. In some embodiments, the server may select multiple actual recipients if more than one gift is available for claiming.

In some embodiments, selecting one or more actual recipients for the at least one gift based on the received gift claims further includes (320): for each of the received gift claims, determining a respective characteristic score for a respective sender of the gift claim; creating a ranking of the received gift claims in accordance with respective characteristic scores of the respective senders of the received gift claims; and selecting the one or more actual recipients for the at least one gift based on the ranking of the received gift claims.

In some embodiments, determining a respective characteristic score for a respective sender of the gift claim further includes (322): determining the respective characteristic score for the respective sender of the gift claim based on a participation level of the respective sender in the online environment.

In some embodiments, the respective participation level of the respective sender of each gift claim is (324) measured by a frequency of a specific physical movement performed by the respective sender during a predetermined claim period. For example, the gift claiming process may require the user to shake his or her client device vigorously for a period of 10 seconds, and if the user has shaken his or her device for more than a threshold number of times within the required time period, then the server determines that the user's participation level has met the participation level required for a successful gift claim. In another example, the gift claiming process may require the user to tap on a touch-sensitive surface of his or her client device vigorously for a period of 10 seconds, and if the user has tapped his or her device for more than a threshold number of times within the required time period, then the server determines that the user's participation level has met the participation level required for a successful gift claim. In some embodiments, the process for performing the physical movement can be made more fun and interesting. For example, in some embodiments, the gift notification contains a mini game for catching gifts (e.g., gold coins or red packets). When the user enters the mini game by invoking a control embedded in the gift notification, a "shower" of gifts can appear on the user's display, and the user must tap the display or otherwise maneuver the client device to catch as many of the gifts as possible within a short time (e.g., before a predetermined claim period, or before the gifts are claimed by other users).

In some embodiments, the respective participation level of the respective sender of each gift claim is (326) measured by a total amount online activity performed by the respective sender during a predetermined claim period. For example, in some embodiments, once a particular user has submitted a gift claim for a particular gift, the server determines whether the user's online activities (e.g., number of posts, number of reposts, number of messages to the sender of the gift, number of interactions with the sender of the gift, etc.) during a predetermined claim period (e.g., a period of time between date range X, or during the 2 days after the gift claim is received by the server, etc.). If the online activities of the user meet a predetermined threshold requirement (e.g., at least 10 posts, at least 10 messages, etc.), the server will consider the gift claim a successful claim and give the gift to the user.

In some embodiments, the respective participation level of the respective sender of each gift claim is (328) measured by a total amount online activity performed by the respective sender during a predetermined historic period. For example, once a particular user has submitted a gift claim for a particular gift, the server determines whether the user's past online activities (e.g., number of posts, number of reposts, number of messages to the sender of the gift, number of interactions with the sender of the gift, etc.) during a predetermined claim period (e.g., a period of time between past date range X, or during the 2 days before the gift claim is received by the server, etc.). If the past online activities of the user meet a predetermined threshold requirement (e.g., at least 10 posts, at least 10 messages, etc.), the server will consider the gift claim a successful claim and give the gift to the user.

In some embodiments, determining a respective characteristic score for a respective sender of the gift claim further includes (330): selecting the actual recipient for the at least one gift based on respective receipt times of the received gift claims, weighted by respective participation levels of respective senders of the gift claims in the online environment.

In some embodiments, the online environment is a social networking platform. In some embodiments, the online environment is an instant messaging platform. In some embodiments, each dynamically created gift is a monetary transfer from a respective financial account associated with the first user to a respective financial account associated with a recipient of the dynamically created gift, and the gifting request authorizes the server to dynamically determine at least one of an exact value for the monetary transfer and an exact identity of the recipient for the monetary transfer in accordance with the one or more gifting constraints.

In some embodiments, prior to being able to submit a gifting request, the user must link his or her financial account with a financial service provider (e.g., a payment service provider or a banking service provider) with his or her social network account on a social network platform provided by the server. In some embodiments, such linking is not required until the gift is claimed and the account transfer to effect the gifting is to be executed. In some embodiments, the server associates (332) a respective financial account of the first user with a respective social network identity of the first user on a social network platform. In some embodiments, based on the one or more gifting constraints, the server dynamically identifies (334), from a group of social network contacts of the first user, at least one second user as an eligible recipient for at least one of the dynamically created gifts. In some embodiments, the server sends (336) an account linking request to the at least one second user via the social network platform to link a respective financial account of each second user to a respective online identity of the second user.

In some embodiments, the account linking request is sent to the at least one second user after the at least one second user has submitted a respective gift claim for the at least one of the dynamically created gifts. In some embodiments, the account linking request is sent to the at least one second user before the at least one second user is permitted to submit a respective gift claim for the at least one of the dynamically created gifts.

In some embodiments, the server associates (338) the respective financial account of the at least one second user to the respective online identity of the at least one second user according to an authorization received in response to the account linking request. In some embodiments, the server creates (340) an account transfer from the respective financial account of the first user to the respective financial account of the second user in accordance with the at least one of the dynamically created gifts (e.g., finally determined gift value).

In some embodiments, the server, after creating the required number of gifts, sends (342) a respective gift notification to each of a plurality of eligible recipients for at least one dynamically created gift, where the respective gift notification providing a means for claiming the at least one dynamically created gift. In some embodiments, the respective notification is presented to each of the plurality of eligible recipient as a chat message from the first user (e.g., as shown in FIG. 2D. In some embodiments, the means for claiming the at least one dynamically created gift is at least one of a link to a gift claiming interface, a button for sending a gift claiming signal to the server, and a bar-code (e.g., a two-dimensional barcode that can be scanned using the claimant's social networking client device). In some embodiments, the means for claiming the at least one dynamically created gift is (344) a prompt for the eligible recipient to perform a predetermined physical action. In some embodiments, the means for claiming, when invoked by a user, further activates a sensor on a user device displaying the prompt to detect whether the predetermined physical action has been performed, and sends a notification to the server upon detecting that the predetermined physical action has been performed.

In some embodiments, the server provides a real-time game for competing for as many gifts as possible among a group of eligible recipients. In some embodiments, the server sends a respective gift notification to each of a plurality of eligible recipients for at least one dynamically created gift. In some embodiments, the sever activates a sensor on a user device displaying a respective gift notification, when a control embedded in the respective notification has been invoked by the user holding the user device. In some embodiments, the server collects the data from each participating client device and divides the gifts among the participants based on how well each participant has done in the competition. In some embodiments, the server displays in on each participant's device the current number of gifts successfully claimed, and the number of gifts that are still remaining in real-time.

In some embodiments, the one or more gifting constraints in the gifting request further includes (346) a gifting time constraint, and the server sends a respective gift notification to each of a plurality of eligible recipients for at least one dynamically created gift at a specific time according the gift timing constraint. For example, in some embodiments, the user may wish to set a gift dissemination time of New Year's Day, and when the New Year's Day arrives, the server starts to send gift notifications to eligible recipients. Other possible gifting time may include other special dates, occasions, etc.

In some embodiments, the one or more gifting constraints further includes (348) a gift dissemination trigger condition, and the server sends a respective gift notification to each of a plurality of eligible recipients for at least one dynamically created gift at a specific time when the gift dissemination trigger condition is satisfied. For example, the user may specify a gift dissemination trigger condition based on his or her savings or profits earned in his or her online store (e.g., "disseminate gifts only if my earning this month exceeds X amount, etc.). In some embodiments, the user may specify a gift dissemination trigger condition based on an external factor, such as the score of a sports team (disseminate gifts if X sport team makes the playoff, etc.). Other dissemination trigger conditions are possible. In some embodiments, if a gift dissemination trigger condition is set in a gifting request, the server starts monitoring facts related to the triggering condition once the gifting request is accepted.

In some embodiments, the gift dissemination trigger condition is (350) detection of a predetermined keyword in a chat message directed to the first user. For example, in some embodiments, the server receives specification of the predetermined keyword (e.g., "Happy New Year!" or "Happy Anniversary" or "Best Wishes to You!" etc.) by the first user in the gifting request. If the user has specified the keyword in the gifting request, the server monitors the incoming messages sent to the user via the social network platform, and scan for the keyword. In some embodiments, the server receives a first chat message from a second user to be delivered to the first user in the online environment (e.g., a social network platform, or an instant message platform). The server delivers the first chat message to the first user in the online environment. In addition, the server also detects the predetermined keyword in the first chat message, and sends a gift notification to the second user in response to detecting the predetermined keyword in the first chat message.

In some embodiments, sending a gift notification to the second user in response to detecting the predetermined keyword in the first chat message further includes sending the gift notification to the second user in a reply message to the first chat message in the online environment (e.g., a social networking platform, an instant message platform, etc.). In some embodiments, on the dialogue record between the first user and the second user, the first chat message showing the required keyword, and the chat message containing the gift notification will be displayed on the devices of both the first and the second users. In some embodiments, the users can continue the conversation regarding the gifts afterwards, thus improving the interactiveness of the gifting process.

In some embodiments, the server monitors (352) whether there are remaining unclaimed gifts created in response to the gifting request. In some embodiments, the server identifies (354) additional eligible recipients for at least one dynamically created gift until all gifts created in response to the gifting request have been claimed.

In some embodiments, the gift claiming process requires cooperation between multiple eligible recipients. In some embodiments, the server, for at least one of the dynamically created gifts, sends (356) a respective gift notification to each of a plurality of eligible recipients. In some embodiments, the server receives (358) two or more gift claims from a subset of the plurality of eligible recipients. In some embodiments, the server determines (360) whether the two or more gift claims as a group satisfy a predetermined group claim criterion. In some embodiments, upon determining that the two or more gift claims as a group satisfy the predetermined group claim criterion, the server notifies (362) respective senders of the two or more gift claims that the at least one of the dynamically created gifts have been claimed successfully by the respective senders.

For example, in some embodiments, the predetermined group claim criterion specifies an acceptable order by which respective gift claims are to be submitted by the subset of the plurality of eligible recipient. In a more specific example, in some embodiments, each gift notification includes a respective sequence number, and the gift notification requires each user to find others that also received gift notifications, and then submits their respective gift claims in the order according to the sequence numbers of the gift notifications that they have received. Suppose that three gift notifications are sent out for a particular gift (or group of gifts), each gift notification includes a sequence number, the three users receiving the notification are instructed to communicate with one another such that they submit their respective gift claim in the order according to the sequence numbers on their respective gift notifications. If the users submit the gift claims in the right order, they receive the gift; otherwise, they do not receive the gift.

In some embodiments, the predetermined group claim criterion specifies an acceptable composition of the subset of the plurality of eligible recipient. In a more specific example, in some embodiments, the respective gift notification sent to each of the plurality of eligible recipient includes an instruction to the eligible recipient how to locate other members of the subset of the plurality of eligible recipients and to submit the two or more gift claims as a group to satisfy the predetermined group claim criterion. For example, suppose that 10 gift notifications are sent out to 10 eligible recipients, and among the 10 gift notifications, there are 5 pairs of notifications, each pair including an identical image. Each user must find the other user that has a notification with the same image as he or she does, and then cooperate to submit their gift claim together, in order to claim the gift successfully.

These variations of requiring communication and cooperation among multiple eligible gift recipients in order to successfully claim a gift may help enhance the user experience and relationships among the people who participate in the gift claiming process.

In some embodiments, the server maintains a record of a total number of gifts (e.g., red packets) received and/or successfully claimed by each user. In some embodiments, the server allows a user to send his or her record of gifting and gift claiming to his or her social contacts over a social network platform provided by the server.

In some embodiments, the server may create a ranking for gift dissemination, and successful gift claiming for gifts generated in response to a single individual gift request, or among all gifts that have been generated by the server. In some embodiments, the server optionally broadcast to users the top-ranked gift senders and gift claimants.

Figure 4:
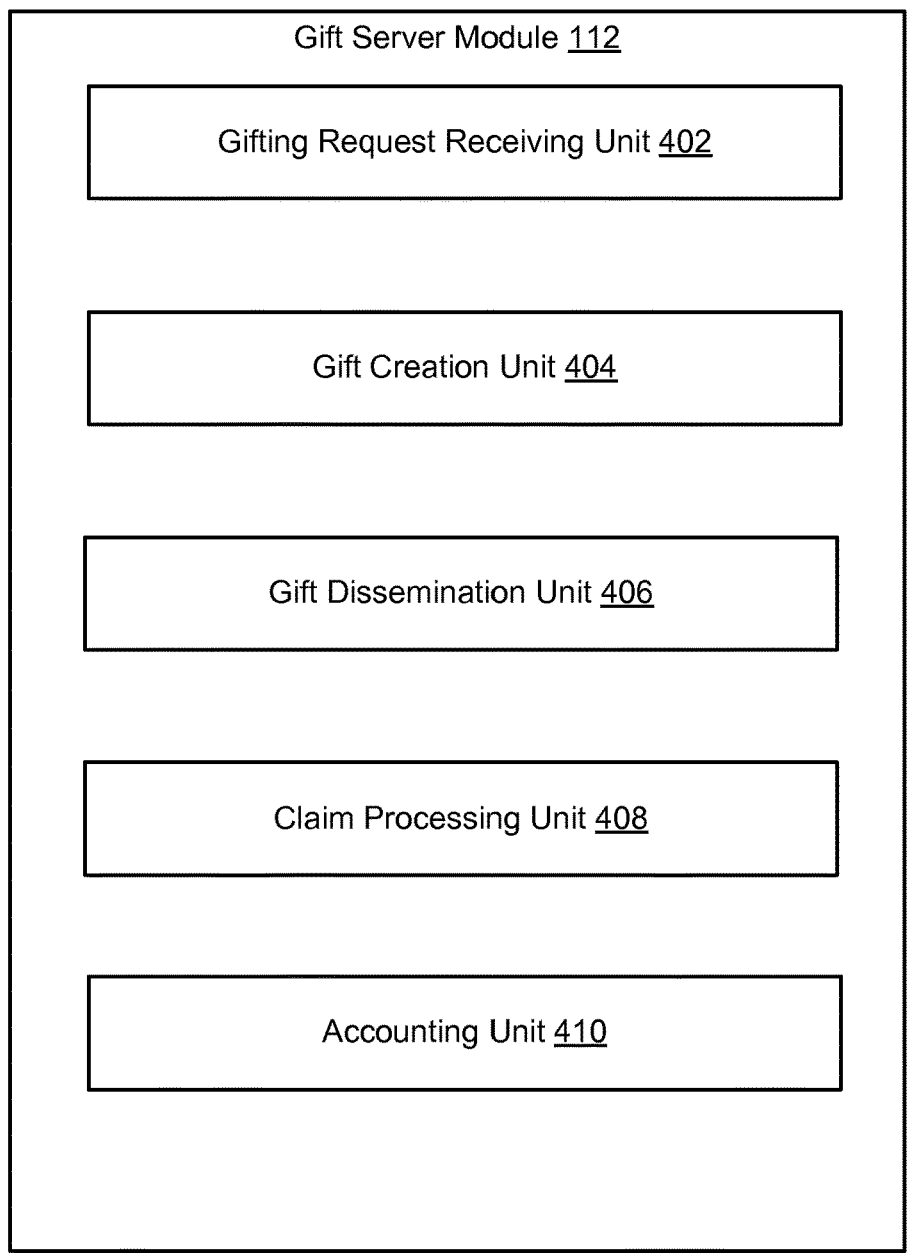
FIG. 4 is a structural diagram of gift server module in accordance with some embodiments.

FIG. 4 is a structural diagram of gift server module 112 in accordance with some embodiments.

In some embodiments, gift server module 112 includes gifting request receiving unit 402, a gift creation unit 404, a gift dissemination unit 406, a claim processing unit 408, and an accounting unit 410.

In some embodiments, gifting request receiving unit 402 is configured to receive a gifting request from a client device (e.g., a device of the gift sender). In some embodiments, the gifting request receiving unit 402 is configured to receive a gifting request from a first user for dynamically creating and disseminating one or more gifts to one or more recipients in the online environment, where the gifting request includes one or more gifting constraints that un-deterministically specify at least one of (1) a respective identity for at least one recipient and (2) a respective gift value for at least one gift wherein the gifting request includes. In some embodiments, the gifting receiving request unit 402 is further configured to perform other functions described above with respect to collecting the gifting request from a client device.

In some embodiments, the gift creation unit 404 is configured to dynamically creating and disseminating at least one gift in accordance with the one or more gifting constraints, including at least one of: dynamically selecting, without further input from the first user, a respective gift value for at least one of a plurality of dynamically created gifts in accordance with the one or more gifting constraints; and dynamically determining, without further input from the first user, a respective identity for at least one of a plurality of recipients for at least one dynamically created gift in accordance with the one or more gifting constraints. In some embodiments, the gift creation unit 404 is further configured to perform other functions described above with respect to creating gifts in accordance with the gifting request.

In some embodiments, the gift dissemination unit 406 is configured to provide respective gift notifications to one or more eligible recipients for the dynamically created gifts. In some embodiments, the gift dissemination unit 406 is further configured to perform other functions described above with respect to disseminating gifts in accordance with the gifting request.

In some embodiments, the claim processing unit 408 is configured to receive gift claims from one or more one or more eligible recipients for the dynamically created gifts. In some embodiments, the claim processing unit 408 is further configured to evaluate the received gift claims to determine if they are successful claims. In some embodiments, the claim processing unit 408 is further configured to perform other functions described above with respect to claiming gifts by eligible recipients.

In some embodiments, the accounting unit 410 is configured to manage the account linking and balance settlement after gifts are created, disseminated, and claimed. In some embodiments, the accounting unit 410 is further configured to perform other functions described above with respect to managing the financial transactions effected by the online gifting actions.

Figure 5:
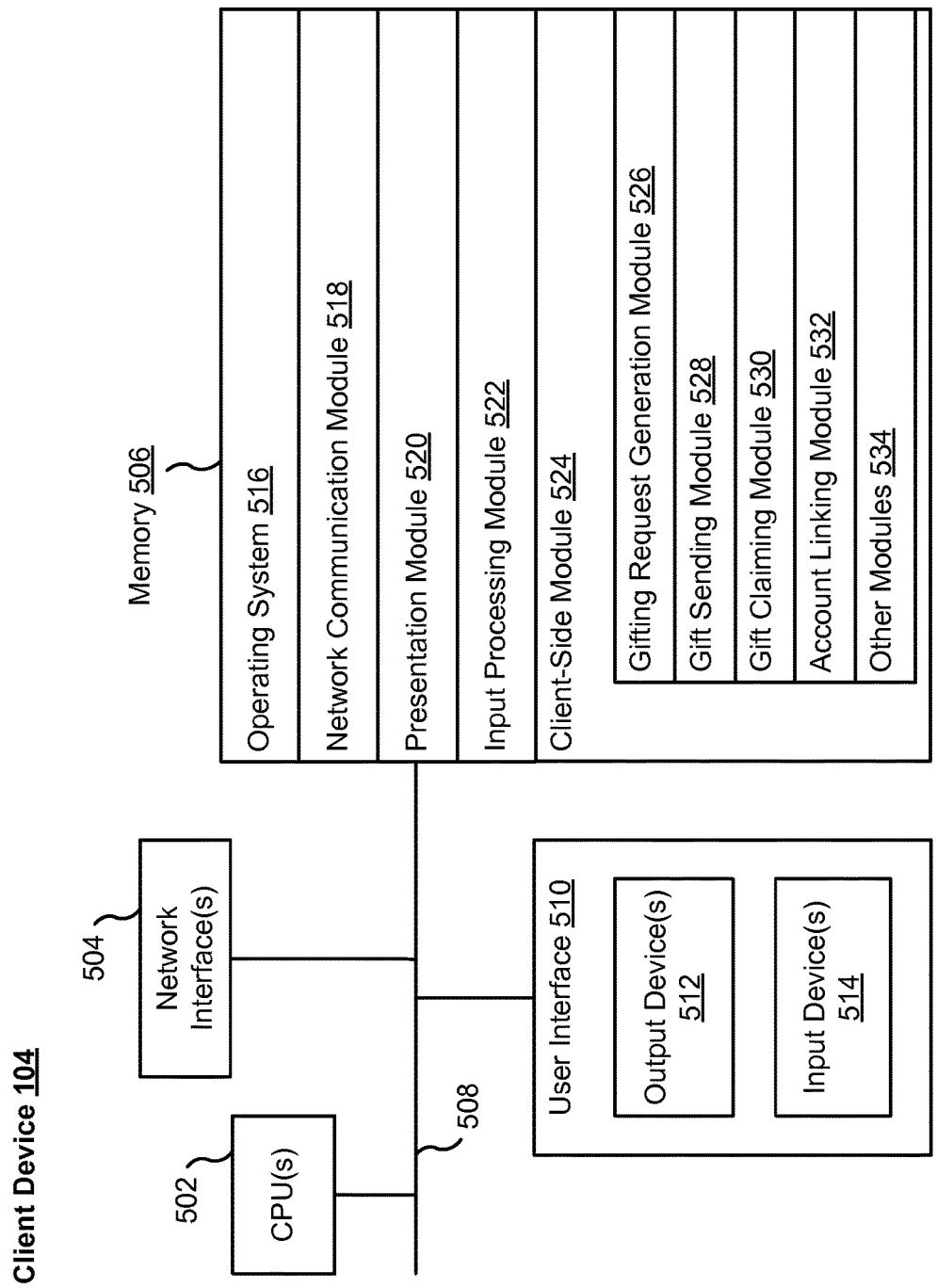
FIG. 5 is a block diagram of a client device in accordance with some embodiments.

FIG. 5 is a block diagram illustrating a representative client device 104 associated with a user in accordance with some embodiments. Client device 104, typically, includes one or more processing units (CPUs) 502, one or more network interfaces 504, memory 506, and one or more communication buses 508 for interconnecting these components (sometimes called a chipset). Client device 104 also includes a user interface 510. User interface 510 includes one or more output devices 512 that enable presentation of media content, including one or more speakers and/or one or more visual displays. User interface 510 also includes one or more input devices 514, including user interface components that facilitate user input such as a keyboard, a mouse, a voice-command input unit or microphone, a touch-screen display, a touch-sensitive input pad, a gesture capturing camera, or other input buttons or controls. Furthermore, some client devices 104 use a microphone and voice recognition or a camera and gesture recognition to supplement or replace the keyboard. Memory 506 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 506, optionally, includes one or more storage devices remotely located from CPU(s) 502. Memory 506, or alternately the non-volatile memory device(s) within memory 506, includes a non-transitory computer readable storage medium. In some implementations, memory 506, or the non-transitory computer readable storage medium of memory 506, stores the following programs, modules, and data structures, or a subset or superset thereof:

- an operating system 516 including procedures for handling various basic system services and for performing hardware dependent tasks;
- a network communication module 518 for connecting user device 104 to other computing devices (e.g., server system 102) connected to one or more networks 106 via one or more network interfaces 504 (wired or wireless);
- a presentation module 520 for enabling presentation of information (e.g., a user interface for a web page or an application program, a game, audio and/or video content, text, etc.) at client device 104 via one or more output devices 512 (e.g., displays, speakers, etc.) associated with user interface 510; and
- an input processing module 522 for detecting one or more user inputs or interactions from one of the one or more input devices 514 and interpreting the detected input or interaction.

In some embodiments, memory 506 also includes a client-side module 524 for performing data processing for a respective social network client application being executed by the user of client device 104. In some embodiments, client-side module 524 includes, but is not limited to:

- a gifting request generation module 526, configured to collect input from the user regarding a gifting request, and sending the gifting request to the gift server module 112;
- a gift sending module 528, configured to send one or more gifts directly to one or more recipient via means chosen by the user.
- a gift claiming module 530, configured to respond to user action to claim a gift and send gift claims to the gift server module 112;
- an account linking module 532, configured to provide client-side functions for establishing a link between a user account on the social network platform and a payment account; and
- other modules 534 configured to perform other client-side functions described herein with respect to online gifting.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 806, optionally, stores additional modules and data structures not described above.

Figure 6:
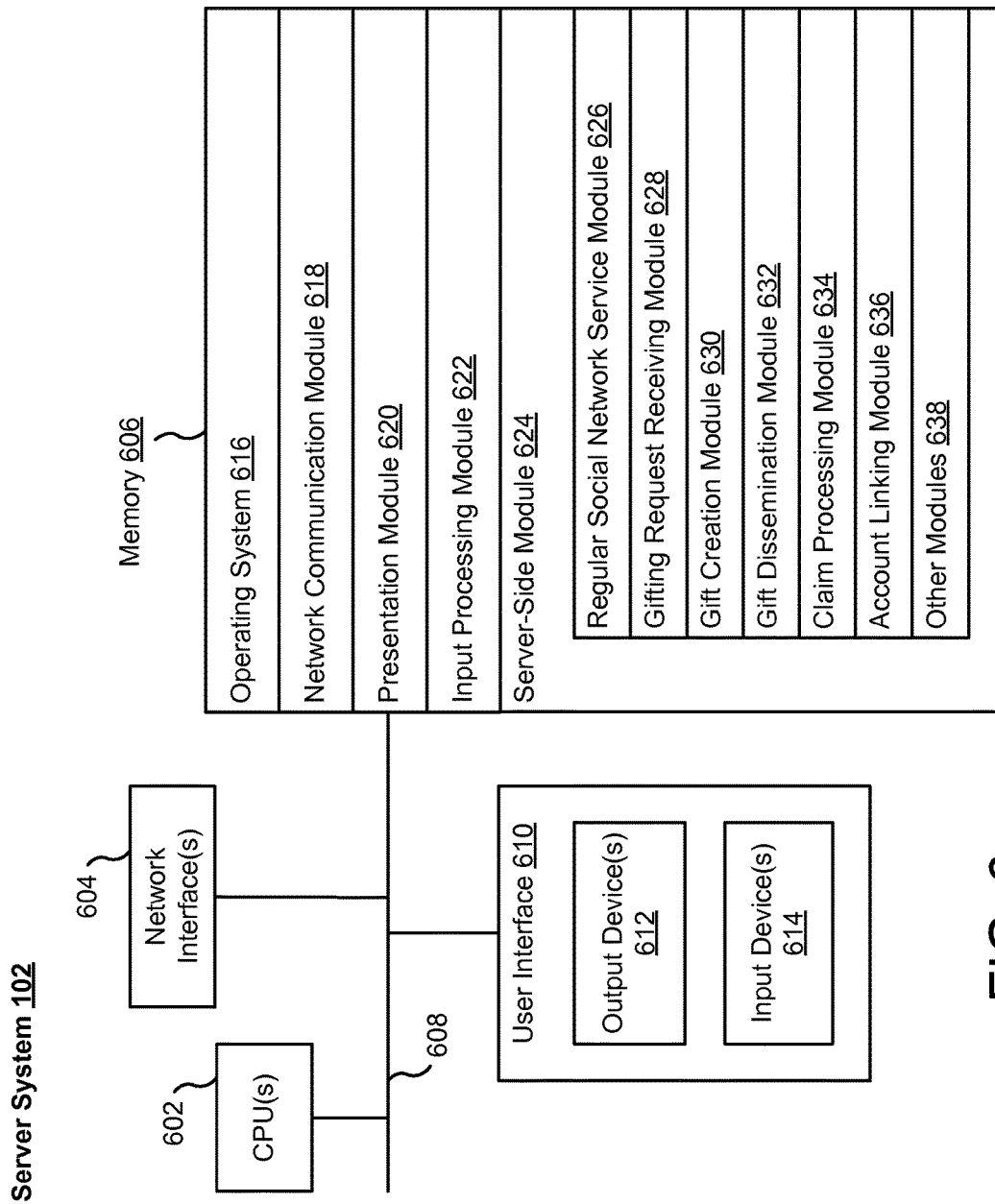
FIG. 6 is a block diagram of a server device in accordance with some embodiments.

FIG. 6 is a block diagram illustrating server system 102 in accordance with some embodiments. Server system 102, typically, includes one or more processing units (CPUs) 602, one or more network interfaces 604, memory 606, and one or more communication buses 608 for interconnecting these components (sometimes called a chipset). Memory 606 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 606, optionally, includes one or more storage devices remotely located from the CPU(s) 602. Memory 606, or alternately the non-volatile memory device(s) within memory 606, includes a non-transitory computer readable storage medium. In some implementations, memory 606, or the non-transitory computer readable storage medium of memory 606, stores the following programs, modules, and data structures, or a subset or superset hereof:

- an operating system 610 including procedures for handling various basic system services and for performing hardware dependent tasks;
- a network communication module 612 that is used for connecting server system 102 to other computing devices (e.g., client devices 104) connected to one or more networks 106 via one or more network interfaces 604 (wired or wireless);
- a server-side module 624 for performing data processing for social network services, including but not limited to:
  - a regular social network service module 626 for providing other social network services (e.g., chatting, user management etc.);
  - a gifting request receiving module 628 for receiving gifting requests from users;
  - a gift creation module 630 for creating gifts in accordance with received gifting requests; and
  - a gift dissemination module 632 for sending out gift notifications to eligible recipients of the created gifts;
  - a claim processing module 634 for processing gift claims received from eligible recipients of the created gifts;

an account linking module 636, configured to provide server-side functions for establishing a link between a user account on the social network platform and a payment account an accounting module 636 for managing account linking and settling financial transfers effected by the successfully claimed gifts; and other modules 638 configured to perform other server-side functions described herein with respect to online gifting.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of providing dynamically determined gift creation and dissemination in an online instant messaging environment including a server and a plurality of mobile terminals that are communicatively coupled to the server, each mobile terminal being associated with a user account at the online instant messaging environment, comprising:

at the server having one or more processors and memory:
establishing a chat group session including multiple users of the online instant messaging environment, each user having access to the chat group session hosted by the server from a respective mobile terminal;

receiving, from a user account associated with a first mobile terminal, a gifting request from a first user of the chat group session for dynamically creating and disseminating one or more gifts to one or more recipients of the chat group session in the online instant messaging environment, wherein the gifting request includes one or more gifting constraints that causes the server to randomly select a respective gift value for at least one of the one or more dynamically created gifts within a gift value range and randomly select a respective identity for the at least one recipient of the chat group session; and dynamically creating and disseminating at least one gift in accordance with the one or more gifting constraints, comprising:
disseminating, to the mobile terminals associated with the user accounts of a plurality of eligible recipients of the chat group session, an invitation in form of a chat message including a gift notification to the chat group session for claiming the at least one gift;

receiving a plurality of gift claims for the at least one gift from one or more of the mobile terminals associated with the user accounts of the plurality of eligible recipients of the chat group session;

selecting, from the plurality of eligible recipients of the chat group session, one or more actual recipients for the at least one gift based on, at least in part, their respective participation levels in the online instant messaging environment;

dynamically selecting for a first recipient of the one or more actual recipients, without further input from the first user, a respective randomly-selected gift value for the at least one gift in accordance with the one or more gifting constraints, wherein the gift value and the identity of the first recipient in the chat group session are determined after a successful claim process has been completed by the first recipient of the chat group session; and sending, to the first mobile terminal associated with the user account of the first user, a gift claiming notification by the first recipient of the chat group session in form of a chat message.

2. The method of claim 1, wherein each dynamically created gift is a monetary transfer from a respective financial account associated with the user account of the first user at the online instant messaging environment to a respective financial account associated with the user account of a recipient of the dynamically created gift at the online instant messaging environment, and wherein the gifting request authorizes the server to dynamically determine at least one of an exact value for the monetary transfer and an exact identity of the recipient for the monetary transfer in accordance with the one or more gifting constraints.

3. The method of claim 1, further comprising:
sending a respective gift notification to each of a plurality of eligible recipients for at least one dynamically created gift, wherein the respective gift notification providing an option for a recipient to claim the at least one dynamically created gift from a mobile terminal associated with a user account of the recipient.

4. The method of claim 1, wherein the one or more gifting constraints further includes a gifting time constraint, and the method further comprises:
sending a respective gift notification to the user account of each of a plurality of eligible recipients for at least one dynamically created gift at a specific time according the gift timing constraint.

5. The method of claim 1, wherein the one or more gifting constraints further includes a gift dissemination trigger condition, and the method further comprises:
sending a respective gift notification to the user account of each of a plurality of eligible recipients for at least one dynamically created gift at a specific time when the gift dissemination trigger condition is satisfied.

6. The method of claim 1, further comprising:
for at least one of the dynamically created gifts, sending a respective gift notification to the user account of each of a plurality of eligible recipients;

receiving two or more gift claims from the user accounts of a subset of the plurality of eligible recipients;

determining whether the two or more gift claims as a group satisfy a predetermined group claim criterion; and upon determining that the two or more gift claims as a group satisfy the predetermined group claim criterion, notifying respective senders of the two or more gift claims that the at least one of the dynamically created gifts have been claimed successfully by the respective senders.

7. A system for providing dynamically determined gift creation and dissemination in an online instant messaging environment including a server and a plurality of mobile terminals that are communicatively coupled to the server, each mobile terminal being associated with a user account at the online instant messaging environment, comprising:
one or more processors; and
memory having instructions stored thereon, the instructions, when executed by the one or more processors, cause the processors to perform operations comprising:
establishing a chat group session including multiple users of the online instant messaging environment, each user having access to the chat group session hosted by the server from a respective mobile terminal;
receiving, from a user account associated with a first mobile terminal, a gifting request from a first user of the chat group session for dynamically creating and disseminating one or more gifts to one or more recipients of the chat group session in the online instant messaging environment, wherein the gifting request includes one or more gifting constraints that causes the server to randomly select a respective gift value for at least one of the one or more dynamically created gifts within a gift value range and randomly select a respective identity for the at least one recipient of the chat group session; and
dynamically creating and disseminating at least one gift in accordance with the one or more gifting constraints, comprising:
disseminating, to the mobile terminals associated with the user accounts of a plurality of eligible recipients of the chat group session, an invitation in form of a chat message including a gift notification to the chat group session for claiming the at least one gift;
receiving a plurality of gift claims for the at least one gift from one or more of the mobile terminals associated with the user accounts of the plurality of eligible recipients of the chat group session;
selecting, from the plurality of eligible recipients of the chat group session, one or more actual recipients for the at least one gift based on, at least in part, their respective participation levels in the online instant messaging environment;
dynamically selecting for a first recipient of the one or more actual recipients, without further input from the first user, a respective randomly-selected gift value for the at least one gift in accordance with the one or more gifting constraints, wherein the gift value and the identity of the first recipient in the chat group session are determined after a successful claim process has been completed by the first recipient of the chat group session; and
sending, to the first mobile terminal associated with the user account of the first user, a gift claiming notification by the first recipient of the chat group session in form of a chat message.

8. The system of claim 7, wherein each dynamically created gift is a monetary transfer from a respective financial account associated with the user account of the first user at the online instant messaging environment to a respective financial account associated with the user account of a recipient of the dynamically created gift at the online instant messaging environment, and wherein the gifting request authorizes the server to dynamically determine at least one of an exact value for the monetary transfer and an exact identity of the recipient for the monetary transfer in accordance with the one or more gifting constraints.

9. The system of claim 7, wherein the operations further comprise:
sending a respective gift notification to each of a plurality of eligible recipients for at least one dynamically created gift, wherein the respective gift notification providing an option for a recipient to claim the at least one dynamically created gift from a mobile terminal associated with a user account of the recipient.

10. The system of claim 7, wherein the one or more gifting constraints further includes a gifting time constraint, and the operations further comprise:
sending a respective gift notification to the user account of each of a plurality of eligible recipients for at least one dynamically created gift at a specific time according the gift timing constraint.

11. The system of claim 7, wherein the one or more gifting constraints further includes a gift dissemination trigger condition, and the operations further comprise:
sending a respective gift notification to the user account of each of a plurality of eligible recipients for at least one dynamically created gift at a specific time when the gift dissemination trigger condition is satisfied.

12. The system of claim 7, wherein the operations further comprise:
for at least one of the dynamically created gifts, sending a respective gift notification to the user account of each of a plurality of eligible recipients;
receiving two or more gift claims from the user accounts of a subset of the plurality of eligible recipients;
determining whether the two or more gift claims as a group satisfy a predetermined group claim criterion; and
upon determining that the two or more gift claims as a group satisfy the predetermined group claim criterion, notifying respective senders of the two or more gift claims that the at least one of the dynamically created gifts have been claimed successfully by the respective senders.

13. A non-transitory computer-readable medium having instructions stored thereon, the instructions, when executed by one or more processors of a computer system, cause the computer system to provide dynamically determined gift creation and dissemination in an online instant messaging environment including a server and a plurality of mobile terminals that are communicatively coupled to the server, each mobile terminal being associated with a user account at the online instant messaging environment, by performing operations comprising:
establishing a chat group session including multiple users of the online instant messaging environment, each user having access to the chat group session hosted by the server from a respective mobile terminal;
receiving, from a user account associated with a first mobile terminal, a gifting request from a first user of the chat group session for dynamically creating and disseminating one or more gifts to one or more recipients of the chat group session in the online instant messaging environment, wherein the gifting request includes one or more gifting constraints that causes the server to randomly select a respective gift value for at least one of the one or more dynamically created gifts within a gift value range and randomly select a respective identity for the at least one recipient of the chat group session; and dynamically creating and disseminating at least one gift in accordance with the one or more gifting constraints, comprising:

disseminating, to the mobile terminals associated with the user accounts of a plurality of eligible recipients of the chat group session, an invitation in form of a chat message including a gift notification to the chat group session for claiming the at least one gift;

receiving a plurality of gift claims for the at least one gift from one or more of the mobile terminals associated with the user accounts of the plurality of eligible recipients of the chat group session;

selecting, from the plurality of eligible recipients of the chat group session, one or more actual recipients for the at least one gift based on, at least in part, their respective participation levels in the online instant messaging environment;

dynamically selecting for a first recipient of the one or more actual recipients, without further input from the first user, a respective randomly-selected gift value for the at least one gift in accordance with the one or more gifting constraints, wherein the gift value and the identity of the first recipient in the chat group session are determined after a successful claim process has been completed by the first recipient of the chat group session; and sending, to the first mobile terminal associated with the user account of the first user, a gift claiming notification by the first recipient of the chat group session in form of a chat message.

14. The computer-readable medium of claim 13, wherein each dynamically created gift is a monetary transfer from a respective financial account associated with the user account of the first user at the online instant messaging environment to a respective financial account associated with the user account of a recipient of the dynamically created gift at the online instant messaging environment, and wherein the gifting request authorizes the server to dynamically determine at least one of an exact value for the monetary transfer and an exact identity of the recipient for the monetary transfer in accordance with the one or more gifting constraints.

15. The computer-readable medium of claim 13, wherein the operations further comprise:

sending a respective gift notification to each of a plurality of eligible recipients for at least one dynamically created gift, wherein the respective gift notification providing an option for a recipient to claim the at least one dynamically created gift from a mobile terminal associated with a user account of the recipient.

16. The computer-readable medium of claim 13, wherein the one or more gifting constraints further includes a gifting time constraint, and the operations further comprise:

sending a respective gift notification to the user account of each of a plurality of eligible recipients for at least one dynamically created gift at a specific time according the gift timing constraint.

17. The computer-readable medium of claim 13, wherein the one or more gifting constraints further includes a gift dissemination trigger condition, and the operations further comprise:

sending a respective gift notification to the user account of each of a plurality of eligible recipients for at least one dynamically created gift at a specific time when the gift dissemination trigger condition is satisfied.

18. The computer-readable medium of claim 13, wherein the operations further comprise:

for at least one of the dynamically created gifts, sending a respective gift notification to the user account of each of a plurality of eligible recipients; receiving two or more gift claims from the user accounts of a subset of the plurality of eligible recipients;

determining whether the two or more gift claims as a group satisfy a predetermined group claim criterion; and upon determining that the two or more gift claims as a group satisfy the predetermined group claim criterion, notifying respective senders of the two or more gift claims that the at least one of the dynamically created gifts have been claimed successfully by the respective senders.

* * * * *